US012733022B2

(12) United States Patent
Shimezawa et al.

(10) Patent No.: US 12,733,022 B2
(45) Date of Patent: Sep. 8, 2026

(54) COMMUNICATION DEVICE, BASE STATION, AND COMMUNICATION METHOD FOR PROCESSING MULTIPLE PARTS OF SIDELINK CONTROL INFORMATION

(71) Applicant: Sony Group Corporation, Tokyo (JP)

(72) Inventors: Kazuyuki Shimezawa, Tokyo (JP); Hiromasa Uchiyama, Tokyo (JP); Naoki Kusashima, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 371 days.

(21) Appl. No.: 18/557,961

(22) PCT Filed: Feb. 15, 2022

(86) PCT No.: PCT/JP2022/005887
§ 371 (c)(1),
(2) Date: Oct. 30, 2023

(87) PCT Pub. No.: WO2022/230309
PCT Pub. Date: Nov. 3, 2022

(65) Prior Publication Data

US 2024/0215055 A1 Jun. 27, 2024

(30) Foreign Application Priority Data

Apr. 30, 2021 (JP) ................................ 2021-077892

(51) Int. Cl.
*H04W 72/40* (2023.01)
*H04W 92/18* (2009.01)

(52) U.S. Cl.
CPC ........... *H04W 72/40* (2023.01); *H04W 92/18* (2013.01)

(58) Field of Classification Search
CPC ..... H04W 72/40; H04W 92/18; H04W 72/25; H04W 72/115
See application file for complete search history.

(56) References Cited

U.S. PATENT DOCUMENTS

2020/0337021 A1* 10/2020 Zhang ....................... H04L 1/08
2021/0051646 A1 2/2021 Maaref

OTHER PUBLICATIONS

Mediatek Inc: "Discussion on Mode 2 enhancements",3GPP Draft; R1-2102690, 3rd Generation Partnership Project (3GPP), Mobile Competence Centre ; 650, Route Des Lucioles ; F-06921 Sophia-Antipolis Cedex ; France J vol. RAN WG1, No. e-Meeting; Apr. 12, 2021-Apr. 20, 2021 Apr. 7, 2021(Apr. 7, 2021), XP052177695.
International Search Report and Written Opinion mailed on May 17, 2022, received for PCT Application PCT/JP2022/005887, filed on Feb. 15, 2022, 7 pages including English Translation.

(Continued)

*Primary Examiner* — Natasha W Cosme
(74) *Attorney, Agent, or Firm* — XSENSUS LLP

(57) ABSTRACT

A communication device that performs sidelink communication with a transmission device, and includes: a control unit that performs a setting related to a configured grant on the basis of first setting information; and a reception unit that receives transmission data transmitted from the transmission device through the sidelink communication on the basis of the setting related to the configured grant.

19 Claims, 14 Drawing Sheets

(56) References Cited

OTHER PUBLICATIONS

3GPP, "Overall description of Radio Access Network (RAN) aspects for Vehicle-to-everything (V2X) based on LTE and NR (Release 16)", 3GPP TR 37.985 V16.0.0, Jun. 2020, pp. 1-35.

Huawei et al., "Discussion on sidelink resource allocation mode 1", 3GPP TSG RAN WG1 Meeting #96bis, R1-1903950, Apr. 8-12, 2019, 8 pages.

Huawei et al., "Sidelink resource allocation mode 1", 3GPP TSG RAN WG1 Meeting #99, R1-1911883, Nov. 18-22, 2019, 24 pages.

* cited by examiner

Figure 4:
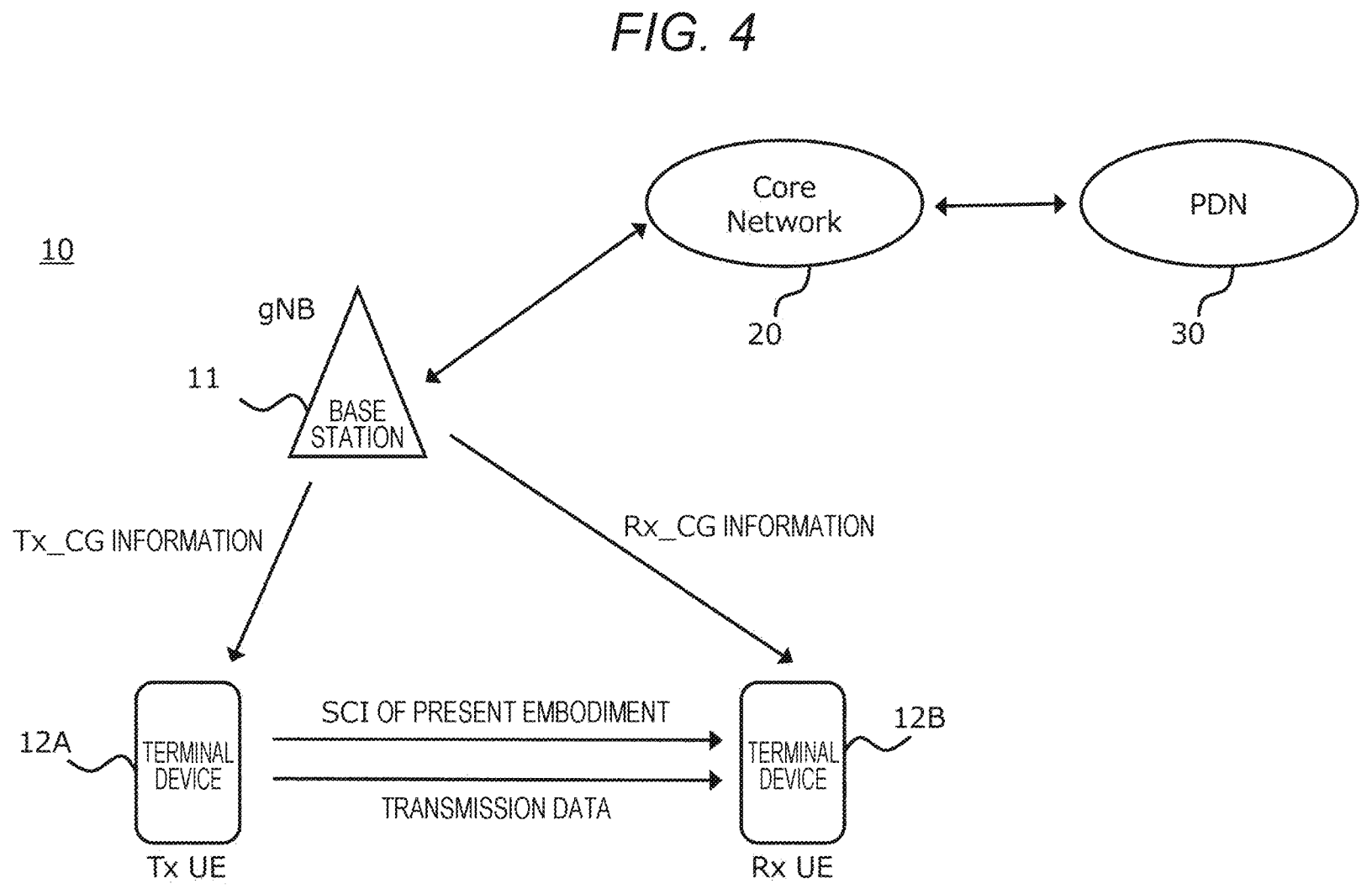

PDN
30

Core Network
20 gNB
BASE STATION
11

Rx_CG INFORMATION

Tx_CG INFORMATION

12B
TERMINAL DEVICE
Rx UE

12A
TERMINAL DEVICE
Tx UE

SCI OF PRESENT EMBODIMENT

TRANSMISSION DATA 210
12: TERMINAL DEVICE
220
WIRELESS COMMUNICATION UNIT
221
SIGNAL RECEPTION UNIT
222
SIGNAL TRANSMISSION UNIT
240
STORAGE UNIT
250
CONTROL UNIT
251
RECEPTION UNIT
252
TRANSMISSION UNIT

40
PDN
30
Core Network
20
gNB2
11B
BASE STATION
gNB1
11A
BASE STATION
SETTING INFORMATION FOR Rx_CG INFORMATION
Rx_CG INFORMATION
Tx_CG INFORMATION
TERMINAL DEVICE
12A
Tx UE
TERMINAL DEVICE
12B
Rx UE
SCI OF PRESENT EMBODIMENT
TRANSMISSION DATA PDN
30
Core Network
20
gNB
BASE STATION
11
50
Tx_CG INFORMATION
TERMINAL DEVICE
Tx UE
12A
Rx_CG INFORMATION
SCI OF PRESENT EMBODIMENT
TRANSMISSION DATA
TERMINAL DEVICE
Rx UE
12B Core Network
PDN
20
30
gNB
60
61
BASE STATION
Rx_CG INFORMATION
Tx_CG INFORMATION
12A
TERMINAL DEVICE
SCI OF PRESENT EMBODIMENT
TERMINAL DEVICE
12B
TRANSMISSION DATA
Tx UE
Rx UE

70

12A
TERMINAL DEVICE
Tx UE

Rx_CG INFORMATION
SCI OF PRESENT EMBODIMENT
TRANSMISSION DATA

12B
TERMINAL DEVICE
Rx UE

COMMUNICATION DEVICE, BASE STATION, AND COMMUNICATION METHOD FOR PROCESSING MULTIPLE PARTS OF SIDELINK CONTROL INFORMATION

CROSS-REFERENCE TO RELATED APPLICATIONS

The present application is based on PCT filing PCT/JP2022/005887, filed Feb. 15, 2022, which claims priority from Japanese Patent Application No. 2021-077892, filed Apr. 30, 2021, the entire contents of each are incorporated herein by reference.

TECHNICAL FIELD

The present disclosure relates to a communication device, a base station, and a communication method.

BACKGROUND ART

In 3GPP, device-to-device (D2D) communication for performing direct communication between terminal devices (UEs) is standardized as sidelink communication in 4G Long Term Evolution (LTE) and 5G New Radio (NR), respectively.

As sidelink communication, vehicle-to-everything (V2X) communication is one of main use cases. As examples of V2X communication, vehicle-to-vehicle (V2V), vehicle-to-infrastructure (V2I), vehicle-to-pedestrian (V2P), and vehicle-to-network (V2N) are assumed. In particular, platooning, advanced driving, extended sensor, and remote driving have been studied as specific use cases of V2X communication in 5G NR. As a requirement related to ultra-reliable and low latency communications (URLLC), a standard has been formulated so as to realize a latency of 10 milliseconds or less and reliability of 99.999%.

Although inter-vehicle communication has been studied as V2X communication, intra-vehicle communication can be proposed as a technology extension in future sidelink communication. For example, sensors and camera modules that have been connected in a wired manner so far are connected to each other by wireless communication as communication devices, and intra-vehicle communication can be performed between these communication devices. In particular, it is expected that the number of such communication devices such as sensors and camera modules will rapidly increase as technologies such as automated driving advance in the future, and it is considered that the demand for connection by wireless communication will increase.

Here, considering automated driving, it is basically important to control an automobile on the basis of data from a sensor or a camera in the vehicle, and it is assumed that information obtained by Inter-vehicle communication (that is, previous V2X communication) is used as auxiliary information. Therefore, the intra-vehicle communication is required to have lower latency and higher reliability than the inter-vehicle communication.

Further, the sidelink communication can be utilized not only in V2X but also in various use cases. For example, automation factory is one of use cases in which sidelink communication can be utilized. In such a factory, it is considered that a large number of devices such as sensors and cameras are installed and directly communicate with each other. In particular, in a case where the production line is frequently changed according to what is to be manufactured, the demand for URLLC for sidelink communication is high.

CITATION LIST

Non-Patent Document

Non-Patent Document 1: 3GPP TR 37.985 V16.0.0 (2020 June) 3rd Generation Partnership Project; Technical Specification Group Radio Access Network; Overall description of Radio Access Network (RAf) aspects for Vehicle-to-everything (V2X) based on LTE and NR (Release 16), [online], [searched on Apr. 2, 2021], Internet <https://www.3gpp.org/ftp//Specs/archive/37_series/37.985/37985-g00.zip>

SUMMARY OF THE INVENTION

Problems to be Solved by the Invention

The present disclosure provides a communication device, a base station, and a communication method capable of improving frequency utilization efficiency of communication between communication devices.

Solutions to Problems

A communication device of the present disclosure is a communication device that performs sidelink communication with a transmission device, and includes: a control unit that performs a setting related to a configured grant on the basis of first setting information; and a reception unit that receives transmission data transmitted from the transmission device through the sidelink communication on the basis of the setting related to the configured grant.

A communication device of the present disclosure includes: a control unit that confirms that a setting related to a configured grant is made in a reception device; and a transmission unit that transmits transmission data to the reception device through sidelink communication after it is confirmed that the setting related to the configured grant is made in the reception device.

BRIEF DESCRIPTION OF DRAWINGS

FIG. 4 is a diagram schematically illustrating an example of a communication system according to the present embodiment.

MODE FOR CARRYING OUT THE INVENTION

Hereinafter, embodiments of the present disclosure are described in detail with reference to the drawings. In one or more embodiments illustrated in the present disclosure, elements included in each of the embodiments can be combined with each other, and the combined result also forms a part of the embodiments described in the present disclosure.

Technical Background of Present Embodiment

First, resource allocation (scheduling) by a configured grant (CG) in conventional sidelink communication will be described.

<Resource Allocation (Scheduling) by CG in Conventional Sidelink Communication>

In Release 16 (Rel-16 NR) of the 5G radio technical specification by 3GPP, sidelink communication supporting resource allocation (scheduling) by a configured grant (CG) is specified (see Non-Patent Document 1). CG is periodic transmission permission set by higher layer signaling (RRC signaling in this example). The resource allocation by the CG is suitably used in a case where the terminal device on the transmission side periodically transmits data in a set of the terminal device on the transmission side and the terminal device on the reception side that perform sidelink communication. For example, in a case where the terminal device on the transmission side periodically transmits data of a predetermined payload size every 10 ms, the base station allocates a resource suitable for data transmission to the terminal device on the transmission side by CG.

Figure 1:
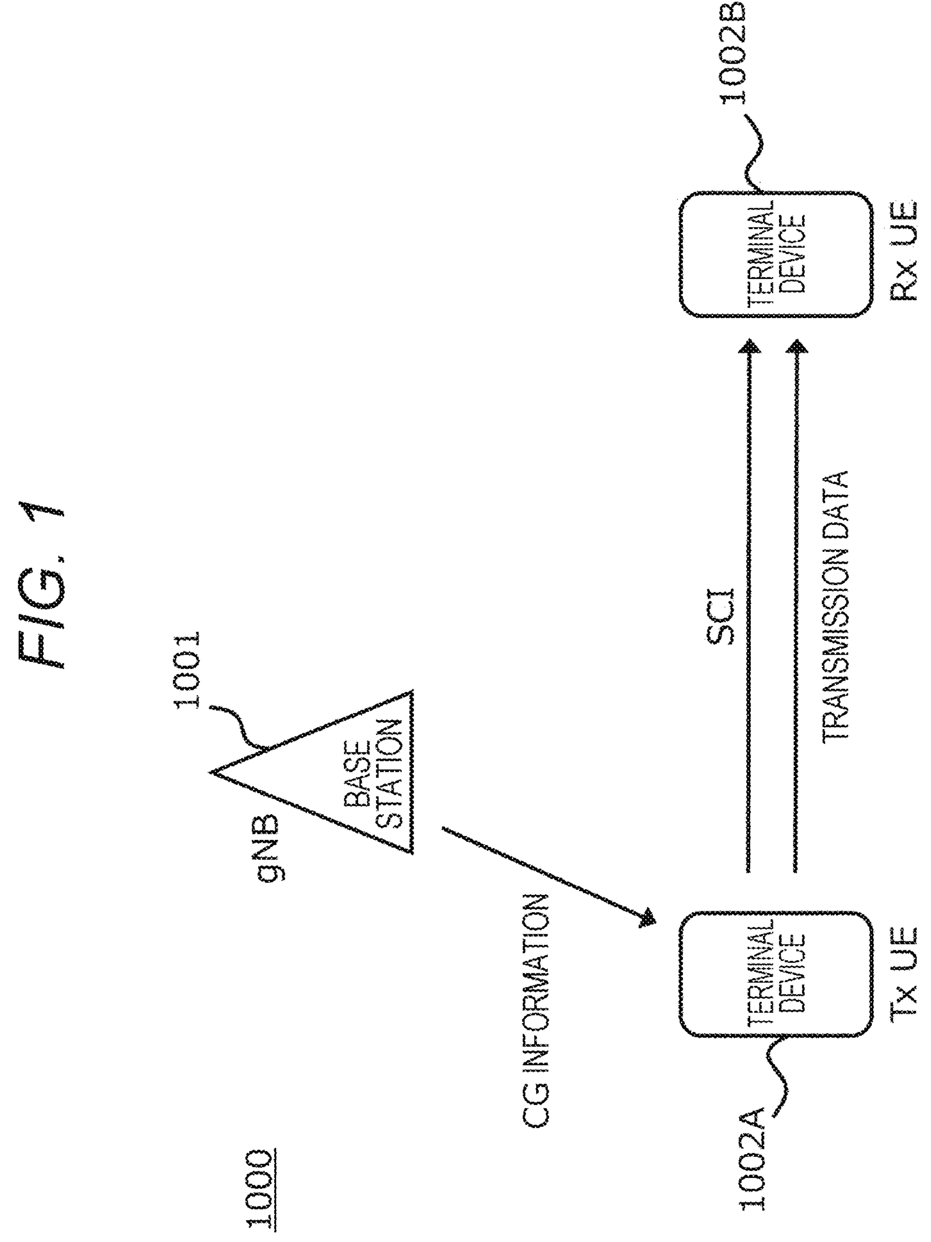
FIG. 1 is a diagram illustrating a communication system according to a related art.

An example of scheduling sidelink communication by CG will be described with reference to FIG. 1. FIG. 1 illustrates a communication system according to the related art. The communication system 1000 in FIG. 1 includes a base station 1001, a terminal device 1002A, and a terminal device 1002B. In addition, the communication system 1000 may include a core network (not illustrated) and a packet data network (PDN) (see FIG. 4 to be described later). The communication system 1000 is, for example, a cellular communication system such as wideband code division multiple access (W-CDMA), code division multiple access 2000 (cdma2000), LTE, or NR. In this example, a case is assumed where the communication system 1000 is an NR cellular communication system. In this case, the base station is referred to as a gNB, and the terminal device is referred to as a UE. The terminal device on the transmission side is referred to as Tx UE, and the terminal device on the reception side is referred to as Rx UE. In the example of the figure, the base station 1001 corresponds to the gNB, the terminal device 1002A corresponds to the Tx UE, and the terminal device 1002B corresponds to the Rx UE.

The base station 1001 transmits setting information (CG information) related to the CG to the terminal device 1002A on the transmission side through RRC signaling. The terminal device 1002A performs sidelink communication with the terminal device 1002B on the reception side using the resource allocated by the CG information. Similarly to the normal sidelink communication, the terminal device 1002A on the transmission side transmits sidelink control information (SCI) in addition to transmission data (sidelink shared channel: SL-SCH) to the terminal device 1002B on the reception side. The SCI is transmitted by physical layer signaling. The terminal device 1002B on the reception side specifies a resource to which transmission data is allocated on the basis of the received SCI, and receives the transmission data. In a case where the resource allocated by the base station 1001 to the terminal device 1002A on the transmission side by the CG is a resource dedicated to sidelink transmission by the terminal device 1002A on the transmission side, it is possible to avoid collision between sidelink transmission by the terminal device 1002A and sidelink transmission from another terminal device (Tx UE). As a result, reliability in sidelink transmission is improved.

<Sidelink Control Information (SCI) Used in Conventional Sidelink Communication and SCI Notification Method>

In sidelink communication, when a Tx UE transmits transmission data to an Rx UE, transmission data (SL-SCH; sidelink shared channel) is transmitted via a physical sidelink shared channel (PSSCH). Further, sidelink control information (SCI) including PSSCH scheduling information is also transmitted.

The SCI is divided into a first SCI (first-stage SCI) and a second SCI (second-stage SCI), and individually transmitted through a physical sidelink control channel (PSCCH) and a PSSCH, respectively.

An outline of the first SCI and the second SCI is as follows.

The first SCI is transmitted through the PSCCH. The first SCI is used for scheduling the PSSCH and scheduling the second SCI stored in the PSSCH. The first SCI includes information for sensing sidelink communication resources, PSSCH resource allocation information, and the like. With respect to the information for sensing, another terminal device can detect, for example, a resource use state or the like by sensing on the basis of the information. One format (SCI format 1-A) is defined as the format of the first SCI.

The second SCI (second-stage SCI) is mapped to a predetermined resource in the PSSCH and transmitted together with transmission data through the PSSCH. The second SCI is transmitted in the same slot or subslot as the first SCI. The second SCI is used, for example, for the terminal device on the reception side to demodulate and decode the PSSCH. For example, the second SCI includes information necessary for identifying, demodulating, and decoding transmission data transmitted through PSSCH, information for hybrid automatic repeat request (HARQ) control, information instructing feedback of channel state information (CSI), and the like. As the format of the second SCI, two formats (SCI format 2-A and SCI format 2-B) are defined.

Details of the SCI in the sidelink communication are described in Non-Patent Document 1 and 3GPP TS 38.212 V16.4.0 (2020-12) 3rd Generation Partnership Project; Technical Specification Group Radio Access Network; NR; Multiplexing and channel coding (Release 16), https://www.3gpp.org/ftp//Specs/archive/38_series/38.212/38212-g40.zip (referred to as Document 1).

Hereinafter, an example of a list of control information included in the SCI format 1-A, the SCI format 2-A, and the SCI format 2-B will be described (see Document 1 described above).

[SCI format 1-A]

The SCI format 1-A includes the following control information (1) to (12).

(1) Priority—3 bits as specified in clause 5.4.3.3 of [12, TS 23.287] and clause 5.22.1.3.1 of [8, TS 38.321].

Priority information: a priority with respect to PSSCH to be scheduled, and is determined according to a use case, traffic, content of transmission data, and the like. For example, the priority information can be used to preferentially use a resource reserved by a PSSCH with a low priority for a PSSCH with a high priority.

(2) Frequency resource assignment $$-\left\lceil \log_2\left(\frac{N^{SL}_{subChannel}(N^{SL}_{subChannel}+1)}{2}\right)\right\rceil$$

bits when the value of the higher layer parameter sl-MaxNumPerReserve is configured to 2; otherwise $$\left\lceil \log_2\left(\frac{N^{SL}_{subChannel}(N^{SL}_{subChannel}+1)(2N^{SL}_{subChannel}+1)}{6}\right)\right\rceil$$

bits when the value of the higher layer parameter sl-MaxNumPerReserve is configured to 3, as defined in clause, 8.1.5 of [6, TS 38.214]. Frequency resource allocation information: Information indicating frequency resources of PSSCH to be scheduled, and allocated in units of subchannels.

(3) Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Time resource allocation information: information indicating a time resource of a PSSCH to be scheduled, and includes information indicating a start symbol and the number of symbols of the PSSCH in the same slot as the PSCCH.

(4) Resource reservation period—$\lceil \log_2 N_{rsv,period} \rceil$ bits as defined in clause 16.4 of [5, TS 38.213], where $N_{rsv,period}$ is the number of entries in the higher layer parameter sl-ResourceReservePeriodList, if higher layer parameter sl-MultiReserveResource is configured; 0 bit otherwise, Resource reservation information: Information for reserving PSSCH transmission resources in slots ahead of the slot to which PSCCH is mapped.

(5) DIMRS pattern—$\lceil \log_2 N_{pattern} \rceil$, bits as' defined in clause 8.4.12 of [4, TS 38.211] where $N_{pattern}$ is the number of DMRS patterns configured by higher layer parameter sl-PSSCH-DMRS-TimePatternList.

DMRS pattern information: Information indicating the pattern of demodulation reference signals (DMRS) corresponding to PSSCH. One or more DMRS patterns are configured in RRC signaling and one of them is indicated in the information.

(6) $2^{nd}$-stage SCI format—2 bits as defined in Table 8.3.1.1-1.

Information regarding the second SCI format: Two or more second SCI formats are defined, and is information indicating one of the second SCI formats.

(7) Beta offset indicator—2 bits as provided by higher layer parameter sl-BetaOffsets2ndSCI and Table 8.3.1.1-2.

Beta offset information: information for determining the number of coded modulation symbols in the second SCI format.

(8) Number of DMRS port—1 bit as defined in Table 8.3.1.1-3.

DMSR port information: information regarding an antenna port of demodulation reference signals (DMRS) corresponding to PSSCH. Specifically, MIMO transmission of a single layer or two layers is indicated.

(9) Modulation and coding scheme—5 bits as defined in clause 8.1.3 of [6, TS 38.214].

MCS information: information indicating a modulation scheme and a coding rate used for PSSCH.

(10) Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.

MCS table information: information indicating an MCS table referred to by the MCS information.

(11) PSFCH overhead indication—1 bit as defined clause 8.1.3.2 of [6, TS 38.214] if higher layer parameter sl-PSFCH-Period=2 or 4; 0 bit otherwise.

PSFCH overhead information: information indicating whether there is a PSFCH in a slot of a scheduled PSSCH. For example, it is used as an overhead of the PSFCH to calculate a payload size of the PSSCH.

(12) Reserved—a number of bits as determined by higher layer parameter sl-NumReservedBits, with value set to zero.

Reserved bit: a bit reserved for future extension of the first SCI format.

[SCI format 2-A]

The SCI format 2-A includes the following control information (21) to (28).

(21) HARQ process number—4 bits as defined in clause 16.4 of [5, TS 38.213].

HARQ process number: information indicating a HARQ process of the PSSCH.

(22) New data indicator—1 bit as defined in clause 16.4 of [5, TS 38.213]. NDI: Information indicating whether the PSSCH is retransmitted.

(23) Redundancy version—2 bits as defined in clause 16.4 of [6, TS 38.214].

RV: information indicating an encoding bit of the PSSCH.

(24) Source ID—8 bits as defined in clause 8.1 of [6, TS 38.214].

Transmission terminal ID: information indicating the Tx UE of the PSSCH.

(25) Destination ID—16 bits as defined in clause 8.1 of [6, TS 38.214].

Reception terminal ID: information indicating the Rx UE of the PSSCH.

(26) HARQ feedback enabled/disabled indicator—1 bit as defined in clause 16.3 of [5, TS 38.213].

HARQ feedback information: information indicating whether HARQ feedback is performed on the PSSCH.

(27) Cast type indicator—2 bits as defined in Table 8.4.1.1-1.

Cast type information: information indicating a cast type of the PSSCH. For example, broadcast, groupcast, or unicast is indicated.

(28) CSI request—1 bit as defined in clause 8.2.1 of [6, TS 38.214].

CSI request information: indicates whether transmission of channel state information (CSI) is requested to the terminal device with the transmission terminal ID.

[SCI format 2-B]

The SCI format 2-B includes the following control information (31) to (38). Since (31) to (36) are the same as (21) to (26) described above, detailed description thereof is omitted.

(31) HARQ process number—4 bits as defined in clause 16.4 of [5, TS 38.213].

(32) New data indicator—1 bit as defined in clause 16.4 of [5, TS 38.213]. (33) Redundancy version-2 bits as defined in clause 16.4 of [6, TS 38.214].

(34) Source ID—8 bits as defined in clause 8.1 of [6, TS 38.214].

(35) Destination ID—16 bits as defined in clause 8.1 of [6, TS 38.214].

(36) HARQ feedback enabled/disabled indicator—1 bit as defined in clause 16.3 of [5, TS 38.213].

(37) Zone ID—12 bits as defined in clause 5.8.11 of [9, TS 38.331].

Zone information: information indicating a zone in which the Tx UE is located. For example, it is used in a case where the Rx UE performs HARQ feedback according to the distance to the Tx UE.

(38) Communication range requirement—4 bits determined by higher layer parameter sl-ZoneConfigMCR-Index.

Communication range information: information indicating a distance in a case where the Rx UE performs HARQ feedback according to the distance to the Tx UE.

The conventional CG information includes the following information. Details of the CG information are described in Document 2 (TS38.331 V16.3.1 (2021-01) <https://www.3gpp.org/ftp//Specs/archive/38_series/38.331/38331-g31.zip>).

(41) sl-ConfigIndexCG

This information indicates an ID for identifying the CG of the sidelink.

(42) sl-CG-MaxTransNumList

This information indicates the maximum number of times a transport block (TB) can be transmitted using the resources provided by the CG. sl-Priority corresponds to the logical channel priority.

(43) sl-FreqResourceCG-Type1

This information indicates the frequency resource arrangement of the sidelink CG type 1. This information is an index that gives a valid combination of one or two starting subchannels and length as a resource indicator (RIV) defined in TS 38.214.

(44) sl-N1PUCCH-AN

This information indicates the HARQ resource for the PUCCH of the sidelink CG type 1. The actual PUCCH resource is set in sl-PUCCH-Config and is referred to by its ID.

(45) sl-NrOfHARQ-Processes

This information represents the number of HARQ processes configured for a particular CG and applies to both Type 1 and Type 2.

(46) sl-PeriodCG

This information indicates a period of the sidelink CG in units of ms.

(47) sl-PSFCH-ToPUCCH-CG-Type1

This information is for CG Type 1 and represents the slot offset between the PSFCH associated with the last PSSCH of each period and the PUCCH used to report the sidelink HARQ.

(48) sl-ResourcePoolID

This information represents a resource pool to which the sidelink CG type 1 is applied.

(49) sl-StartSubchannelCG-Type1

This information represents a starting subchannel of the sidelink CG type 1, and is an index giving a valid subchannel index.

(50) sl-TimeOffsetCG-Type1

This information represents a time offset related to SFN=sl-TimeReferenceSFN-Type1 defined in TS 38.321.

(51) sl-TimeReferenceSFN-Type1

This information represents a system frame number (SFN) used to determine an offset of a resource in time domain. If this information exists, the UE uses the SFN closest to the indicated number prior to reception of the sidelink CG type 1 (TS 38.321, clause 5.8.3). In a case where this information does not exist, the reference SFN is 0.

(52) sl-TimeResourceCG-Type1

This information indicates the time resource arrangement of the sidelink CG type 1, and is an index that gives a valid combination of two slot positions at the maximum as a time resource indicator (TRIV) defined in TS 38.212.

Physical resource mapping in conventional sidelink communication will be described.

Figure 2:
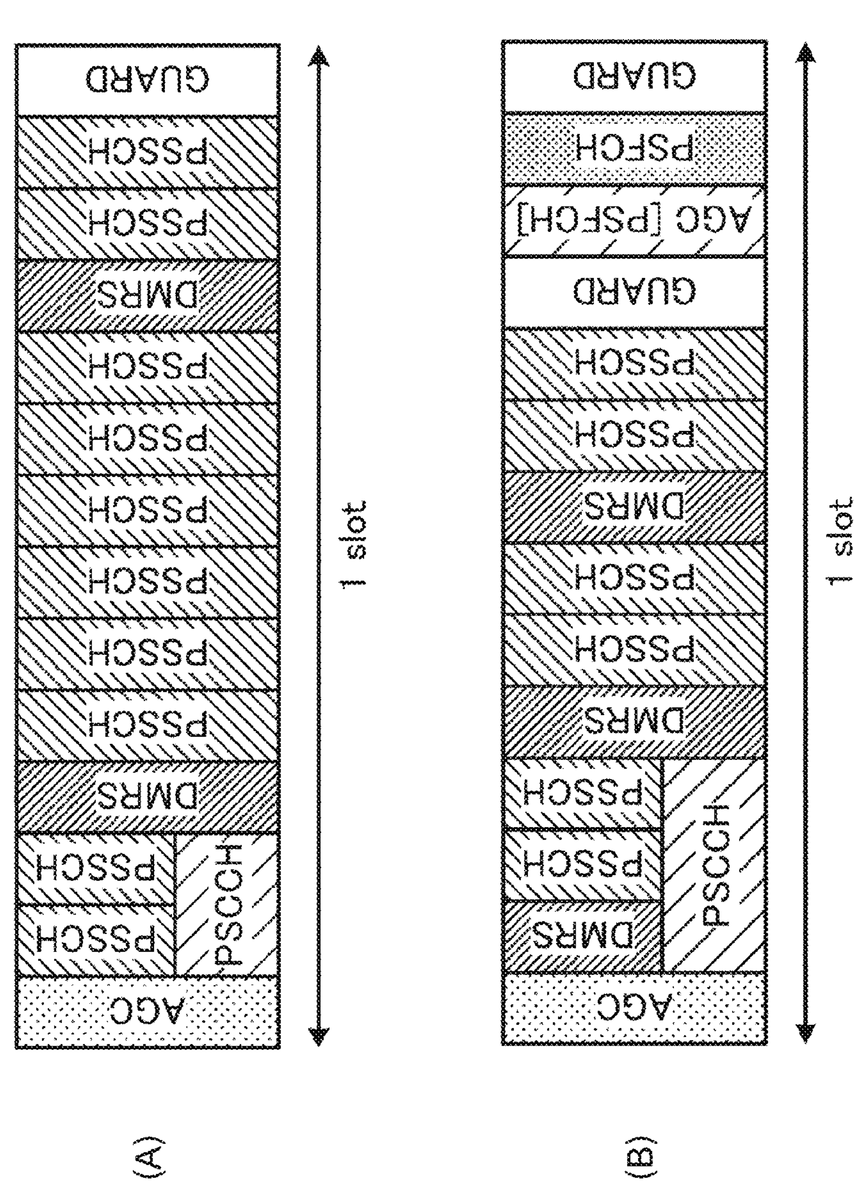
FIG. 2 is a diagram illustrating an example of physical resource mapping used in sidelink communication.

FIGS. 2(A) and 2(B) illustrate an example of physical resource mapping used in sidelink communication (see Non-Patent Document 1). FIGS. 2(A) and 2(B) illustrate an example of a frame configuration in sidelink communication.

In FIGS. 2(A) and 2(B), in the sidelink communication in 3GPP, signal transmission and reception are performed on the basis of a frame configuration with a slot including 14 symbols as a minimum unit. The horizontal direction is a time direction, and the vertical direction is a frequency direction. Each symbol is configured as, for example, an OFDM symbol having a width of 1 MHz. Here, in a case where the subcarrier interval is 15 kHz, the time length of one slot is 1 millisecond.

The frame of FIG. 2(A) includes auto gain control (AGC), physical sidelink control channel (PSCCH), physical sidelink shared channel (PSSCH), demodulation reference signal (DMRS), and GUARD. All these symbols are transmitted in one slot, and one sidelink transmission is performed.

The frame in FIG. 2(B) includes AGC, PSCCH, PSSCH, DMRS, and GUARD as the first to 11th symbols in one slot, and includes AGC, physical sidelink feedback channel (PSFCH), and GUARD as the 12th to 14th symbols. The first to 11th symbols in one slot are transmitted as one sidelink transmission, and the 12th to 14th symbols are transmitted as one sidelink transmission. In this case, a plurality of sidelink transmissions may be included in one slot.

Figure 3:
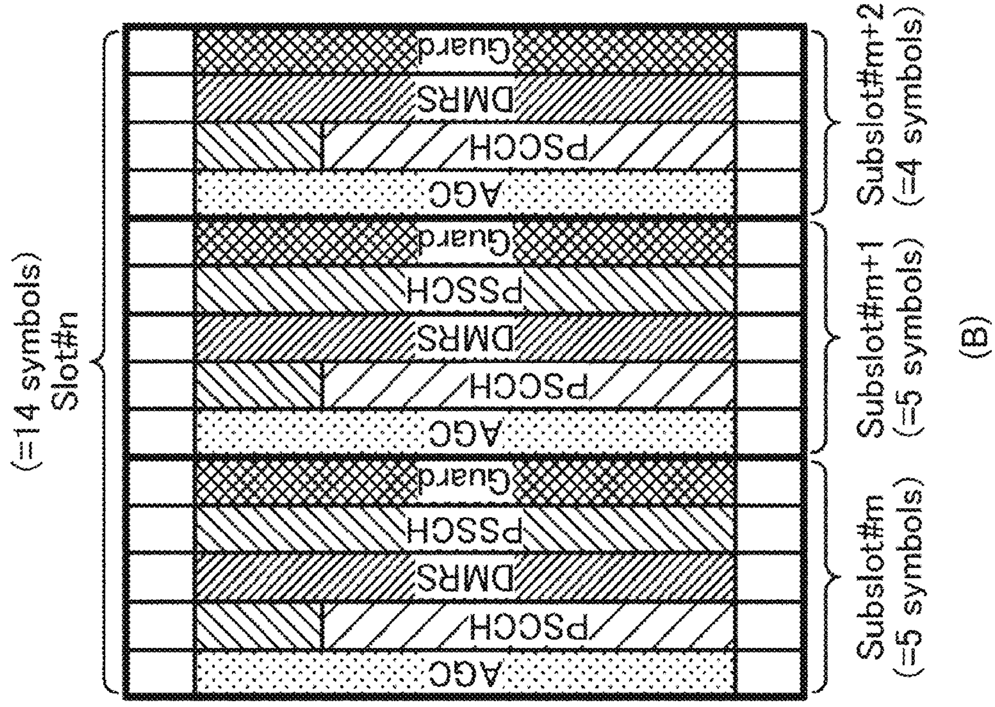
FIG. 3 is a diagram illustrating an example of physical resource mapping in a case where sidelink communication is performed in units of subslots.
Figure 3:
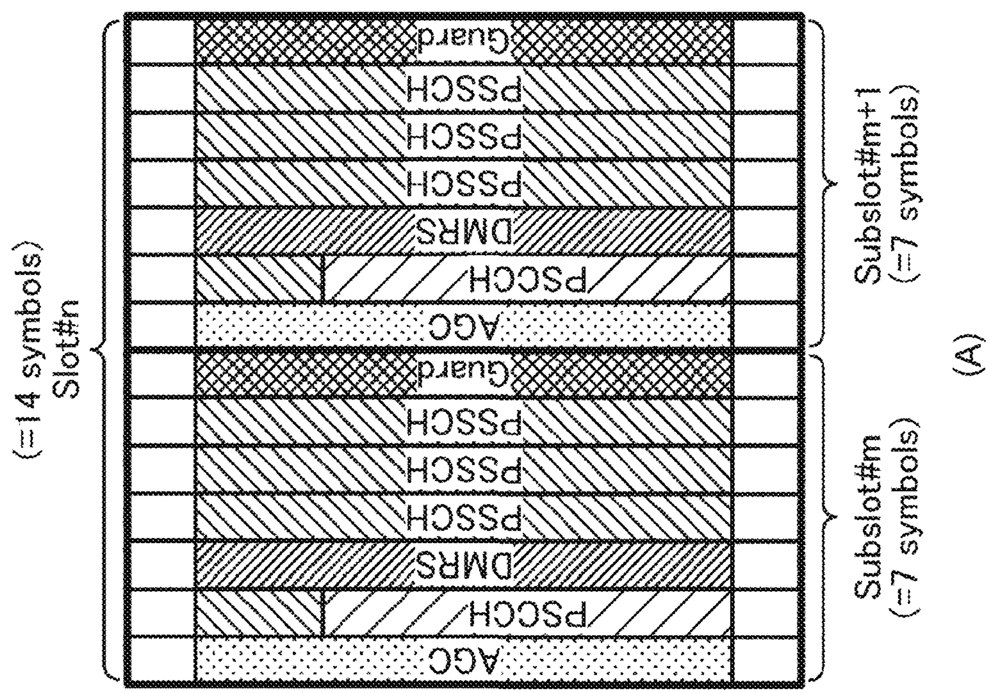

FIGS. 3(A) and 3(B) illustrate an example of physical resource mapping in a case where sidelink communication is performed in units of subslots which are time units shorter than the slots of FIGS. 2(A) and 2(B). FIGS. 3(A) and 3(B)

illustrate a configuration example of the subslot. By performing sidelink communication in units of subslots, ultra-low latency of sidelink communication can be realized.

FIG. 3(A) illustrates physical resource mapping in a case where the subslot length is seven symbols. A slot (Slot #n) including 14 symbols includes two subslots (Subslot #m and Subslot #m+1) each including seven symbols. In this manner, a plurality of subslots having the same size (the number of symbols) may be arranged in one slot.

FIG. 3(B) illustrates physical resource mapping in a case where the subslot length is set to five or four symbols. A slot (Slot #n) including 14 symbols includes three subslots (Subslot #m, Subslot #m+1, and Subslot #m+2). The Subslot #m and the Subslot #m+1 include five symbols, and the Subslot #m+2 includes four symbols. In this manner, a plurality of subslots having different sizes (the number of symbols) may be arranged in one slot.

FIGS. 3(A) and 3(B) illustrate an example in which AGC, PSCCH, PSSCH, DMRS, and GUARD are transmitted as the subslot transmission, but the configuration of the subslot is not limited to this example. AGC, PSFCH, and GUARD may be transmitted in one subslot.

Problems of Present Embodiment

Problems of resource allocation (scheduling) by a configured grant (CG) in conventional sidelink communication will be described.

As described above, the resource allocation by the CG in the sidelink communication is performed from the base station to the terminal device (Tx UE) on the transmission side, and is not performed to the terminal device (Rx UE) on the reception side. The Rx UE performs reception processing of transmission data through the SCI transmitted from the Tx UE in the normal sidelink communication. In a case where the Tx UE performs sidelink communication with a specific Rx UE by using a resource allocated by the CG, a part of SCI transmitted each time sidelink communication is performed may be the same information. Repeated transmission of the same information leads to a decrease in resource utilization efficiency, and is undesirable from the viewpoint of resource utilization efficiency.

In particular, the payload size (data size) of the SCI is hardly changed even in a case where the unit of the time domain in which the sidelink communication is performed is short such as a subslot (see FIGS. 3(A) and 3(B)). Therefore, in a case where the unit of the time domain in which the sidelink communication is performed is a subslot, the overhead of the SCI becomes relatively large with respect to the entire resource used for the sidelink communication.

The present embodiment improves frequency utilization efficiency in sidelink communication. In the present embodiment, a case where periodic resources for sidelink communication are allocated by CG will be described, but the present invention is not limited thereto. The present embodiment can be similarly applied to normal sidelink communication (in a case where resources are allocated for each communication) (details will be described later).

Outline of Present Embodiment

In the present embodiment, a notification of CG information (Rx_CG information) for setting control information (first control information) corresponding to a part of the SCI is provided to the Rx UE in advance, and the Rx UE is caused to set the first control information. The Tx UE starts sidelink communication after confirming that the Rx UE has acquired the Rx_CG information or has set the first control information. When performing sidelink transmission to the Rx UE, the Tx UE deletes control information (first control information) set in the Rx UE from a conventional SCI (a remaining part of the SCI or second control information), and transmits the SCI together with transmission data. As a result, the payload size (data size) of the SCI transmitted from the Tx UE to the Rx UE can be reduced as compared with the related art. That is, the payload size of the SCI transmitted from the Tx UE to the Rx UE can be reduced by setting the sidelink communication in the Rx UE and then performing the sidelink communication. Therefore, the resources used for the control information necessary for the sidelink communication can be reduced, and as a result, the frequency utilization efficiency of the sidelink communication can be improved.

As an example of improving the frequency utilization efficiency, since the overhead for the SCI is reduced, the ratio of resources available for PSSCH among the physical resources used for transmission increases. Thereby, the payload size of the transmission data can be increased, and the frequency utilization efficiency can be improved. In addition, as the number of resources to which the transmission data can be mapped increases, the coding rate can be further improved by transmitting more encoded parity bits for the transmission data. This enables high-quality sidelink transmission. In particular, in a case where the sidelink communication is performed in units of subslots, the overhead of the SCI becomes relatively large, and thus, the effect of the present embodiment is further enhanced.

Instead of a part of the conventional SCI, control information corresponding to the entire SCI may be configured in the Rx UE in advance. In this case, since the Tx UE does not need to transmit the SCI (because the payload size of the SCI becomes zero), the frequency utilization efficiency of the sidelink communication can be further improved. In the following description, a case is assumed where control information corresponding to a part of the SCI is configured in the Rx UE.

Various forms are possible for a method of setting control information (first control information) corresponding to a part of the SCI in the Rx UE in advance, contents of a part of the SCI (contents of the first control information), and the like. Hereinafter, embodiments of the present disclosure will be described in detail.

First Embodiment

FIG. 4 is a diagram schematically illustrating an example of a communication system 10 according to the present embodiment. Description of the matters described above with reference to FIG. 1 will be omitted as appropriate. The communication system 10 includes a base station 11, a terminal device 12A (transmission device), a terminal device 12B (reception device), a core network 20, and a packet data network (PDN) 30. Although only one base station 11 is illustrated in FIG. 4, a plurality of base stations 11 may be arranged, and the plurality of base stations 11 may communicate with each other via a predetermined interface (for example, an X2 interface or the like). The terminal devices 12A and 12B are terminal devices in a cell (coverage) operated by the base station 11. Although two terminal devices are illustrated, three or more terminal devices may be disposed. An arbitrary terminal device is referred to as a terminal device 12.

The communication system 10 is, for example, a cellular communication system such as wideband code division multiple access (W-CDMA), code division multiple access 2000 (cdma2000), LTE, or NR. "LTE" includes LTE-Advanced (LTEA), LTE-Advanced Pro (LTE-A Pro), and Evolved Universal Terrestrial Radio Access (EUTRA). In addition, "NR" includes New Radio Access Technology (NRAT) and Further EUTRA (FEUTRA). In the present embodiment, a case is assumed where the communication system 10 is an NR cellular communication system.

NR is a next generation (fifth generation) radio access technology (RAT) of LTE. The NR is a radio access technology that can support various use cases including enhanced mobile broadband (eMBB), massive machine type communications (mMTC), and ultra-reliable and low latency communications (URLLC).

Note that the communication system 10 is not limited to the cellular communication system. For example, the communication system 10 may be another wireless communication system such as a wireless local area network (LAN) system, a television broadcasting system, an aviation wireless system, or a space wireless communication system.

The base station 11 is a communication device that operates a cell and provides a wireless service to one or more terminal devices located within the coverage of the cell. The cell can be operated according to any wireless communication scheme such as NR. The base station 11 is connected to the core network 20. The core network 20 is connected to the PDN 30. The base station 11 may be configured to manage a plurality of cells. In this example, the base station 11 is a 5G base station and corresponds to a gNB.

The core network 20 is an NR core network (5G Core (5GC)), and may include an access and mobility management function (AMVF), a session management function (SMF), a user plane function (UPF), a policy control function (PCF), and a unified data management (UDM).

The terminal device 12A is a wireless communication device that wirelessly communicates with other devices. The terminal device 12A is, for example, a sensor or a camera device having a communication function, a mobile phone, a smart device (smartphone or tablet), a personal digital assistant (PDA), or a personal computer. The terminal device 12B may be a head-mounted display, VR goggles, or the like having a function of wirelessly transmitting and receiving data. The terminal devices 12A and 12B are 5G terminal devices and correspond to UEs. In particular, the terminal device 12A is a terminal device on the transmission side and corresponds to the Tx UE. The terminal device 12B is a terminal device on the reception side and corresponds to the Rx UE.

For example, the terminal device 12A wirelessly communicates with the terminal device 12B on the basis of control by the base station 11 or autonomously. In this case, the terminal device 12A transmits a sidelink signal to the terminal device 12B via a predetermined interface (for example, the PC5 interface), and receives a sidelink signal (for example, a signal including ACK or the like) from the terminal device 12B. Hereinafter, the transmission and reception of the sidelink signal by the terminal device 12A will be collectively referred to as sidelink communication. The terminal device 12A may be able to use an automatic retransmission technology such as hybrid automatic repeat request (HARQ) when performing sidelink communication.

The wireless communication used by the terminal device 12 may be wireless communication using a millimeter wave or a terahertz wave. Note that the wireless communication (including sidelink communication) used by the terminal device 12 may be wireless communication using radio waves or wireless communication (optical wireless) using infrared rays or visible light.

The Tx_CG information, the Rx_CG information, the SCI of the present embodiment, and the transmission data illustrated in FIG. 4 will be described later.

<Configuration of Base Station>

Figures 5, 6:
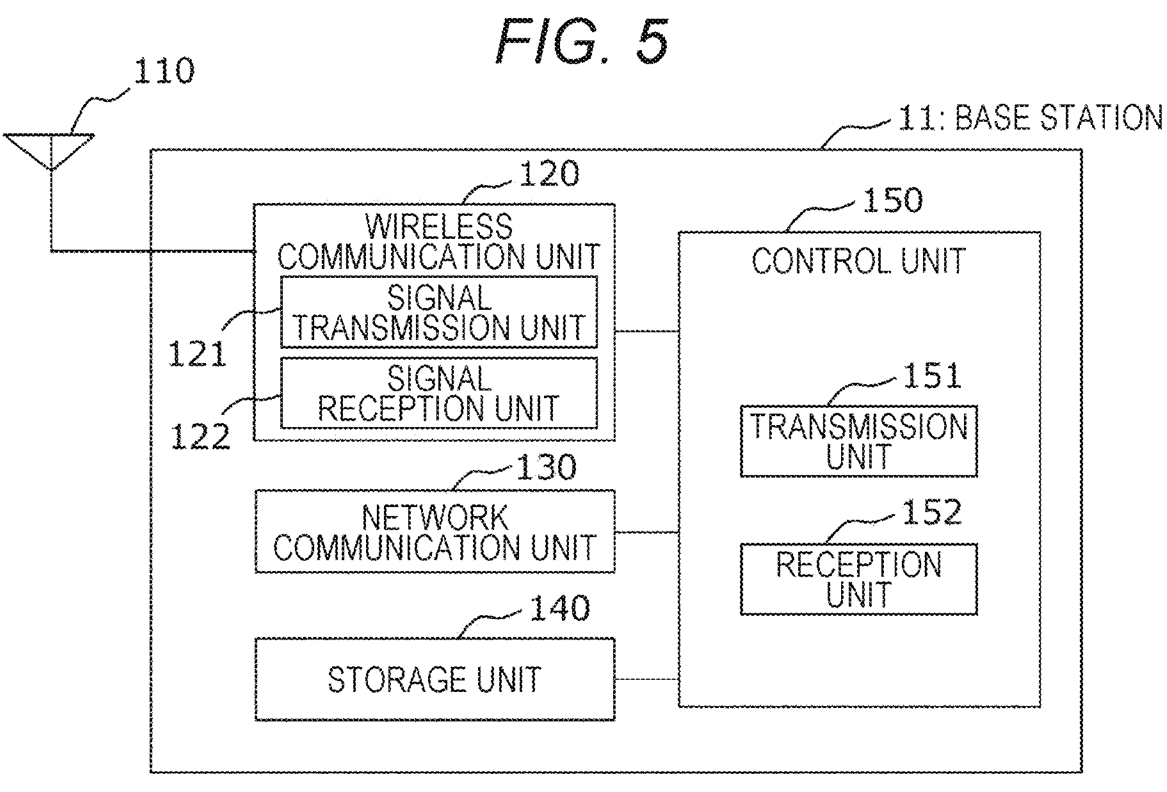
FIG. 5 is a block diagram illustrating an example of a base station according to the present embodiment.
FIG. 6 is a block diagram illustrating an example of a terminal device according to the present embodiment.

FIG. 5 is a block diagram illustrating an example of the base station 11 according to the present embodiment. The base station 11 includes an antenna 110, a wireless communication unit 120, a network communication unit 130, a storage unit 140, and a control unit 150. The wireless communication unit 120, the network communication unit 130, and the control unit 150 are realized by, for example, a processor (hardware processor) such as a central processing unit (CPU) or a micro-processing unit (MPU), or an integrated circuit such as an application specific integrated circuit (ASIC) or a field-programmable gate array (FPGA). The storage unit 140 is realized by an arbitrary recording medium such as a memory, a hard disk device, an optical disk, or a magnetic recording device. The memory may be a volatile memory or a nonvolatile memory.

The antenna 110 radiates a signal output from the wireless communication unit 120 into space as a radio wave. Furthermore, the antenna 110 converts a radio wave in space into a signal and outputs the signal to the wireless communication unit 120. The antenna 110 may have a plurality of antenna elements and form a beam.

The wireless communication unit 120 transmits and receives signals. The signal includes data or information. The wireless communication unit 120 includes a signal transmission unit 121 that transmits a signal and a signal reception unit 122 that receives a signal. For example, the signal transmission unit 121 transmits a downlink signal to the terminal device 12, and the signal reception unit 122 receives an uplink signal from the terminal device 12. The wireless communication unit 120 may form a plurality of beams by the antenna 110 and communicate with the terminal device 12.

The network communication unit 130 transmits and receives information. For example, the network communication unit 130 transmits information to other nodes and receives information from other nodes. The other nodes include, for example, at least one of another base station or a core network node.

The storage unit 140 temporarily or permanently stores programs and data for the operation of the base station 11.

The control unit 150 includes a reception unit 152 and a transmission unit 151. The reception unit 152 of the control unit 150 receives data or information from the terminal device 12 via the wireless communication unit 120 or the signal reception unit 122. The transmission unit 151 of the control unit 150 transmits data or information to the terminal device 12 via the wireless communication unit 120 or the signal transmission unit 121.

The control unit 150 controls the operation of the entire base station 11 and provides various functions of the base station 11.

The control unit 150 determines resources (resource pool) usable for sidelink communication by the CG for the terminal device 12A (Tx UE) on the transmission side. The control unit 150 generates setting information (CG information) for performing setting related to sidelink communication by CG for the terminal device 12A (Tx UE). The CG information generated for the terminal device 12A (Tx UE) is described as Tx_CG information. As an example, the Tx_CG information corresponds to the second setting information for performing the setting related to the sidelink communication in the transmission device. The transmission unit 151 transmits the generated Tx_CG information to the terminal device 12A via the wireless communication unit 120 or the signal transmission unit 121 (see FIG. 4). As an example, the Tx_CG information is transmitted through RRC signaling. For example, the Tx_CG information includes information for performing setting related to the sidelink communication, such as information indicating the above-described determined resource.

The Tx_CG information may include similar contents to the CG information in the sidelink communication by the conventional CG. Further, the Tx_CG information may include additional control information that is not included in the conventional CG information. For example, the base station 11 may determine the control information determined by the terminal device on the transmission side in the conventional sidelink communication by CG, and include information indicating the determined control information in the Tx_CG information. For example, the base station 11 may determine information designating a modulation scheme, and include control information indicating the determined modulation scheme in the Tx_CG information.

Furthermore, the control unit 150 of the base station 11 generates setting information (CG information) for setting control information (first control information) related to sidelink communication also for the terminal device 12B (Rx UE) on the reception side. The CG information generated for the terminal device 12B is described as Rx_CG information. As an example, the Rx_CG information corresponds to the first setting information for performing the setting related to the sidelink communication in the reception device. The transmission unit 151 of the base station 11 transmits the generated Rx_CG information to the terminal device 12B through RRC signaling (see FIG. 4). The Rx_CG information includes information for setting a part or all of the control information included in the SCI in the conventional sidelink communication by the CG to the Rx UE as the first control information. As an example, the Rx_CG information includes information indicating a resource received by sidelink communication. In addition, in a case where the additional control information (the modulation scheme in the above example) is included in the Tx_CG information, the control information identical to the additional information may be included in the Rx_CG information as the first control information. Note that the content of the Rx_CG information may be different from or the same as the Tx_CG information.

The reception unit 152 of the base station 11 may receive notification information indicating that the setting of the sidelink communication based on the Tx_CG information is completed from the terminal device 12A. In this case, the transmission unit 151 may transmit notification information indicating that the setting of the sidelink communication in the terminal device 12A is completed to the terminal device 12B. Similarly, the reception unit 152 may receive notification information indicating that the setting of the sidelink communication based on the Rx_CG information is completed from the terminal device 12B. In this case, the transmission unit 151 may transmit notification information indicating that the setting of the sidelink communication in the terminal device 12B is completed to the terminal device 12A.

Furthermore, the control unit 150 of the base station 11 may determine resources (resource pool) available by the terminal device 12A or the terminal device 12B for normal sidelink communication. The transmission unit 151 may transmit resource information indicating the determined resource to the terminal device 12A.

Furthermore, the transmission unit 151 of the base station 11 may transmit, to the terminal device 12A or the terminal device 12B, setting information regarding sensing performed by the terminal device 12A or the terminal device 12B during sidelink communication (sidelink communication by CG or normal sidelink communication). The sensing is performed for the terminal device to grasp the use state of resources available in the sidelink communication. As a result, it is possible to reduce the occurrence of data (that is, PSSCH) collision between the terminal device and another terminal device.

<Configuration of Terminal Device>

FIG. 6 is a block diagram illustrating an example of the terminal device 12 (12A and 12B) as the communication device according to the present embodiment. The terminal device 12 includes an antenna 210, a wireless communication unit 220, a storage unit 240, and a control unit 250. The wireless communication unit 220 and the control unit 150 are realized by, for example, a processor (hardware processor) such as a central processing unit (CPU) or a microprocessing unit (MPU), or an integrated circuit such as an application specific integrated circuit (ASIC) or a field-programmable gate array (FPGA). The storage unit 240 is realized by an arbitrary recording medium such as a memory, a hard disk device, an optical disk, or a magnetic recording device. The memory may be a volatile memory or a nonvolatile memory.

The antenna 210 radiates a signal output from the wireless communication unit 220 into space as a radio wave. Furthermore, the antenna 210 converts a radio wave in space into a signal and outputs the signal to the wireless communication unit 220. The antenna 210 may have a plurality of antenna elements and form a beam.

The wireless communication unit 220 transmits and receives signals. The signal includes data or information. The wireless communication unit 220 includes a signal transmission unit 221 that transmits a signal and a signal reception unit 222 that receives a signal. For example, the signal reception unit 222 receives a downlink signal from the base station 11, and the signal transmission unit 221 transmits an uplink signal to the base station 11. The wireless communication unit 220 can form a plurality of beams by the antenna 210 and communicate with the base station 11.

The storage unit 240 temporarily or permanently stores programs and various data for the operation of the terminal device 12.

The control unit 250 of the terminal device 12 (12A and 12B) controls the entire operation of the terminal device 12 and provides various functions of the terminal device 12.

For example, the control unit 250 of the terminal device 12 acquires CG information (Tx_CG information or Rx_CG information) transmitted by the base station 11. The CG information (Tx_CG information or Rx_CG information) includes information for making settings related to sidelink communication.

The control unit 250 of the terminal device 12 performs sensing for performing sidelink transmission. The control unit 250 of the terminal device 12 may perform sensing on the basis of setting information regarding sensing acquired from the base station 11.

In a case where the terminal device 12 is the terminal device 12A, that is, in a case where the terminal device 12 operates as the Tx UE, the control unit 250 of the terminal device 12A performs setting related to sidelink communication (sidelink transmission) on the basis of the Tx_CG information. When the setting related to the sidelink communication is performed, the transmission unit 251 of the terminal device 12A transmits notification information (response information) of setting completion to the base station 11 via the wireless communication unit 220 or the signal transmission unit 221. The control unit 250 generates an SCI (SCI according to the present embodiment) to be transmitted together with transmission data at the time of sidelink transmission on the basis of the Tx_CG information.

In a case where the terminal device 12 is the terminal device 12B, that is, in a case where the terminal device 12 operates as the Rx UE, the control unit 250 of the terminal device 12 performs setting related to sidelink communication (sidelink reception) on the basis of the Rx_CG information. For example, the Rx_CG information includes control information for receiving data by sidelink communication, such as information indicating a resource for receiving data by sidelink and information for demodulating/decoding data, and the control unit 250 sets the control information for the sidelink communication. When the setting related to the sidelink communication is performed, the reception unit 252 of the terminal device 12B transmits notification information (response information) of setting completion to the base station 11 via the wireless communication unit 220 or the signal transmission unit 221.

The control unit 250 of the terminal device 12A (Tx UE) and the control unit 250 of the terminal device 12B (Rx UE) confirm that the setting of the sidelink communication based on the CG information is completed by a predetermined method.

As a first method, for example, the terminal device 12A and the terminal device 12B notify each other that the setting is completed using normal sidelink communication after the setting based on the CG information is completed. The normal sidelink communication is an example of signaling different from sidelink communication by CG. The transmission unit 251 of the terminal device 12A transmits notification information indicating that the setting of the terminal device 12A is completed to the terminal device 12B, and the transmission unit 251 of the terminal device 12B transmits notification information indicating that the setting of the terminal device 12B is completed to the terminal device 12A. As a result, the terminal device 12A and the terminal device 12B mutually confirm that the setting of the sidelink communication is completed.

As a second method, the base station 11 may transmit notification information indicating that the setting of the sidelink communication of the terminal device 12B is completed to the terminal device 12A, and may transmit notification information indicating that the setting of the sidelink communication of the terminal device 12A is completed to the terminal device 12B. The second method is suitable for use in a case where both the Tx UE and the Rx UE are within the coverage of one base station (in-coverage) as in the configuration illustrated in FIG. 4.

After confirming that the setting of the sidelink communication is completed by the terminal device 12A (Tx UE) and the terminal device 12B (Rx UE), the control unit 250 of the terminal device 12A executes the sidelink transmission. The transmission unit 251 of the terminal device 12A transmits the SCI according to the present embodiment together with the transmission data by sidelink transmission under the control of the control unit 250 (see FIG. 4). The SCI according to the present embodiment includes control information of fewer items than the SCI in the conventional sidelink communication. Specifically, the SCI according to the present embodiment does not include the same control information as the control information (first control information) set by the Rx_CG information transmitted from the base station 11 to the terminal device 12B. As a result, the data amount of the SCI transmitted from the terminal device 12A to the terminal device 12B can be reduced. The reception unit 252 of the terminal device 12B receives the data transmitted from the terminal device 12A by the sidelink transmission according to the setting of the sidelink communication performed on the basis of the Rx_CG information. That is, the terminal device 12A receives the transmission data on the basis of the control information (first control information) set on the basis of the Rx_CG information and the SCI (second control information) according to the present embodiment received from the terminal device 12A.

More specifically, in order for the terminal device 12B to receive the transmission data to be sidelink transmitted from the terminal device 12A, control information similar to the SCI in the conventional sidelink communication by CC is required. In the present embodiment, instead of transmitting the entire conventional SCI from the terminal device 12A to the terminal device 12B, a part of the SCI is set in the terminal device 12B in advance as the first control information by the Rx_CG information. That is, the control information to be deleted from the conventional SCI is set as the first control information, and a notification of the first control information is provided or set in advance to the terminal device 12B via the Rx_CG information. The terminal device 12A transmits the remaining part of the conventional SCI (control information not deleted from the conventional SCI) as the SCI (second control information) according to the present embodiment to the terminal device 12B together with transmission data at the time of sidelink transmission. As a result, it is possible to reduce the data amount of the SCI transmitted to the terminal device 12B at the time of sidelink transmission from the terminal device 12A. Thereafter, also when sidelink transmission is periodically performed from the terminal device 12A according to the CG, the terminal device 12A only needs to transmit the SCI (second control information) according to the present embodiment together with transmission data, and thus, the utilization efficiency of the frequency is further enhanced. Specific examples of the first control information and the second control information will be described later.

Figure 7:
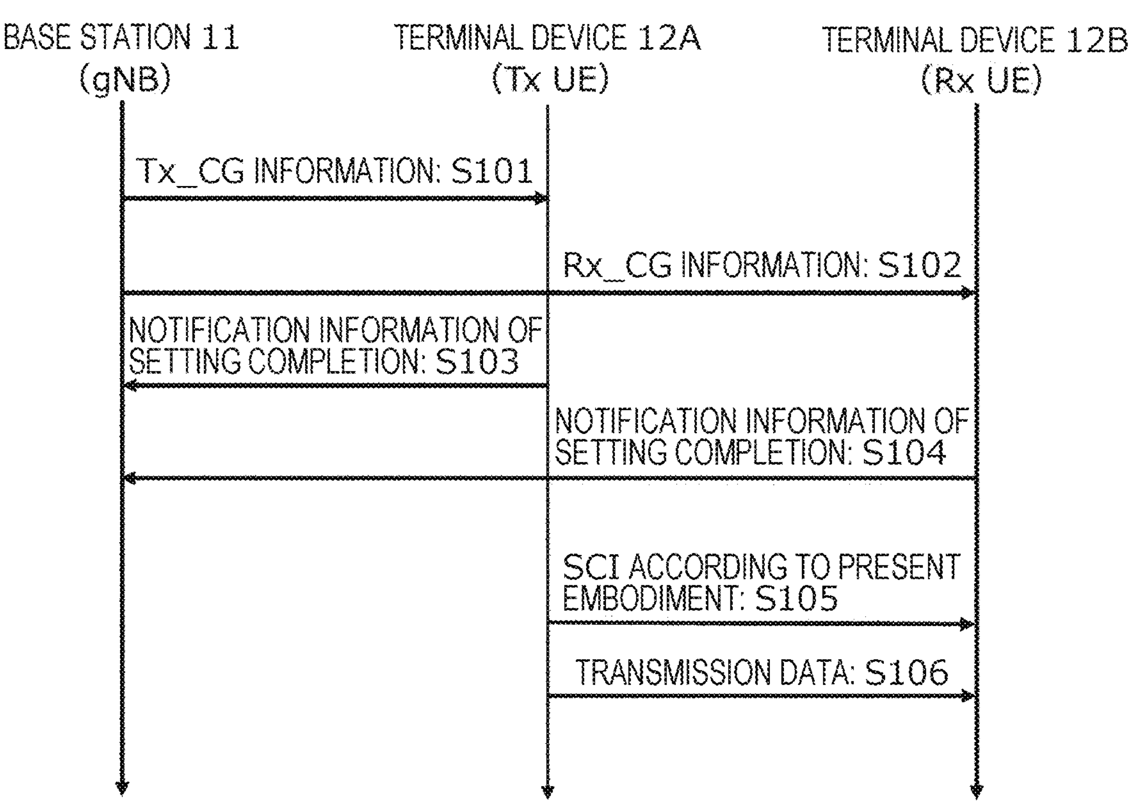
FIG. 7 is an operation flowchart of the communication system according to the present embodiment.

FIG. 7 is an operation flowchart of the communication system 10 according to the present embodiment. The base station 11 serving as the gNB generates Tx_CG information for the terminal device 12A serving as the Tx UE, and transmits the Tx_CG information to the terminal device 12A (S101). The base station 11 transmits Tx_CG information in response to, for example, a CG request related to sidelink communication from the terminal device 12A. Further, the base station 11 generates Rx_CG information for the terminal device 12B as the Rx UE, and transmits the Rx_CG information to the terminal device 12B (S102).

The terminal device 12A sets the sidelink communication on the basis of the Tx_CG information, and transmits notification information indicating the completion of the setting to the base station 11 (S103). The terminal device 12B sets sidelink communication on the basis of the Rx_CG information (for example, sets control information necessary for sidelink reception), and transmits notification information indicating completion of the setting to the base station 11 (S104). The terminal device 12A and the terminal device 12B confirm that the setting is completed by the above-described method. For example, the terminal device 12A and the terminal device 12B may directly transmit a notification of setting completion to each other, or may notify each other of setting completion via the base station 11.

The terminal device 12A transmits the SCI (second control information) according to the present embodiment and the transmission data to the terminal device 12B by sidelink transmission on the basis of the setting of the sidelink communication, for example, on the basis of the resource allocated by the Tx_CG information (S105, S106). The SCI (second control information) and the transmission data according to the present embodiment are transmitted in the same slot or the same subslot. The SCI (second control information) according to the present embodiment is transmitted by at least one of the PSCCH or the PSSCH, and the transmission data is transmitted by the PSSCH. The control information transmitted on the PSCCH in the SCI according to the present embodiment corresponds to the first SCI according to the present embodiment, and the control information transmitted on the PSCCH in the SCI according to the present embodiment corresponds to the second SCI according to the present embodiment.

On the basis of the setting of the sidelink communication based on the Rx_CG information, that is, on the basis of the control information set on the basis of the Rx_CC information, the terminal device 12B specifies a resource used in the sidelink transmission of the terminal device 12A (for example, a resource to which the SCI according to the present embodiment is transmitted) and the like. The terminal device 12B demodulates and decodes the signal of the specified resource to acquire the SCI according to the present embodiment. The terminal device 12B specifies a resource in which the transmission data is stored from the acquired SCI according to the present embodiment, and demodulates and decodes the transmission data from the specified resource to acquire.

Second Embodiment

In the second embodiment, the terminal device 12B (Rx UE) belongs to a base station different from the terminal device 12A (Tx UE), and the terminal device 12B receives the Rx_CG information from the base station. The second embodiment is suitable for use in a case where Tx UE and Rx UE are in coverage of different base stations (in-coverage). Hereinafter, differences from the first embodiment will be mainly described, and the same description as that of the first embodiment will be appropriately omitted.

Figure 8:
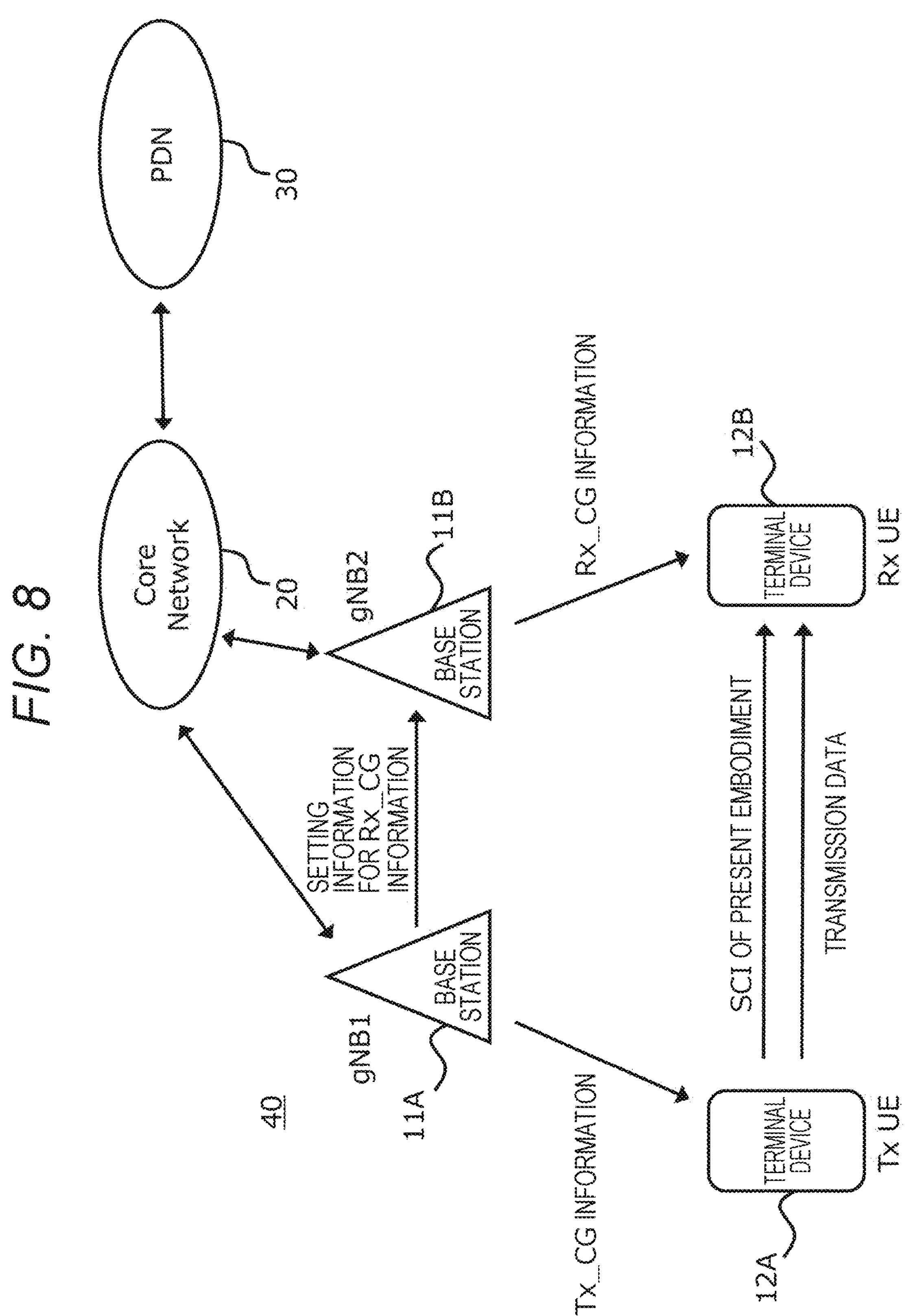
FIG. 8 is a diagram schematically illustrating another example of the communication system according to the present embodiment.

FIG. 8 is a diagram schematically illustrating an example of a communication system 40 according to the present embodiment. The communication system 40 includes a base station 11A (gNB1), a base station 11B (gNB2), a terminal device 12A (Tx UE), a terminal device 12B (Rx UE), a core network 20, and a packet data network (PDN) 30. The terminal device 12A is a terminal device in a cell (coverage) operated by the base station 11A. The terminal device 12B is a terminal device in a cell (coverage) operated by the base station 11B. The base station 11A and the base station 11B are connected to each other in a wired or wireless manner, and can transmit and receive information using a predetermined interface such as an X2 interface. The base station 11A and the base station 11B are connected to the core network 20, and can transmit and receive information such as control information to and from each other through the core network 20.

The block diagrams of the base station 11A and the base station 11B are the same as those in FIG. 5 of the first embodiment, and some functions of the blocks are extended or changed. The block diagrams of the terminal device 12A and the terminal device 12B are the same as those in FIG. 6 of the first embodiment, and some functions of the blocks are extended or changed.

When determining to permit the sidelink communication by the CG on the basis of the request from the terminal device 12A, the control unit 150 of the base station 11A generates setting information (which may be the Rx_CG information itself) for setting Rx_CG. The transmission unit 151 of the base station 11A transmits the generated setting information to the base station 11B. In addition, the control unit 150 of the base station 11A generates Tx_CG information similarly to the first embodiment, and the transmission unit 151 of the base station 11A transmits the Tx_CG information to the terminal device 12A.

The control unit 150 of the base station 11B receives the setting information from the base station 11A via the reception unit 152, and generates the Rx_CG information on the basis of the received setting information. The transmission unit 151 of the base station 11B transmits the Rx_CG information to the terminal device 12B.

The control unit 250 of the terminal device 12A and the control unit 250 of the terminal device 12B perform the setting of the sidelink communication, and then perform processing of confirming that the setting of the sidelink communication is completed. As an example, the transmission unit 251 of the terminal device 12A transmits notification information of setting completion to the base station 11B via the base station 11A. When the reception unit 152 of the base station 11B receives the notification information from the terminal device 12A, the transmission unit 151 of the base station 11B transmits the notification information from the terminal device 12A to the subordinate terminal device 12B. Similarly, the transmission unit 251 of the terminal device 12B transmits notification information of setting completion to the base station 11A via the base station 11B. When the reception unit 152 of the base station 11A receives the notification information from the terminal device 12A, the transmission unit 151 of the base station 11A transmits the notification information from the terminal device 12B to the subordinate terminal device 12A. Note that the terminal devices 12A and 12B may perform processing or the like of regarding that the setting of the sidelink communication in the other terminal device is completed when a certain period of time has elapsed after receiving the Tx_CG information and the Rx_CG information, respectively. In this case, transmission of the notification information by the terminal devices 12A and 12B is unnecessary.

After the terminal devices 12A and 12B confirm each other that the setting of the sidelink communication is completed, the sidelink communication is performed between the terminal devices 12A and 12B. This operation is similar to that of the first embodiment.

Figure 9:
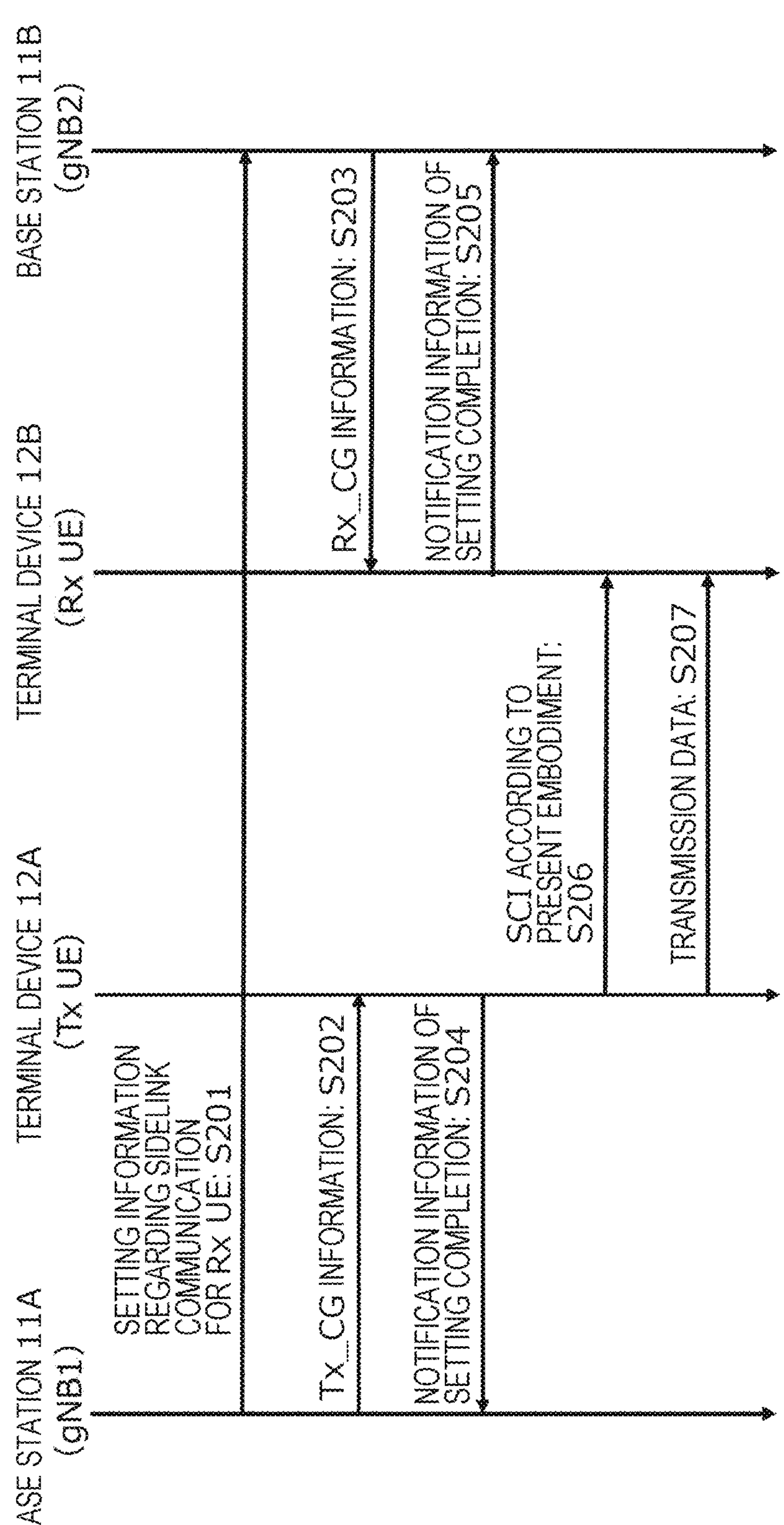
FIG. 9 is an operation flowchart of the communication system in FIG. 8.

FIG. 9 is an operation flowchart of the communication system 40 according to the present embodiment. When the base station 11A determines to permit the terminal device 12A to perform the sidelink communication using the CG, setting information (which may be the Rx_CG information itself) for receiving the sidelink communication is generated, and the setting information is transmitted to the base station 11B to which the terminal device 12B serving as a communication counterpart belongs (S201).

Furthermore, the base station 11A generates Tx_CG information for the terminal device 12A, and transmits the Tx_CG information to the terminal device 12A (S202). The base station 11B generates Rx_CG information on the basis of the setting information acquired from the base station 11A, and transmits the Rx_CG information to the terminal device 12B (S203).

The terminal device 12A sets the sidelink communication on the basis of the Tx_CG information, and transmits notification information indicating the completion of the setting to the base station 11A (S204). The terminal device 12B sets the sidelink communication on the basis of the Rx_CG information, and transmits notification information indicating the completion of the setting to the base station 11B (S205). The terminal device 12A and the terminal device 12B mutually confirm that the setting is completed.

The terminal device 12A transmits the SCI (second control information) according to the present embodiment and the transmission data to the terminal device 12B by sidelink transmission on the basis of the resource allocated by the Tx_CG information (S206, S207). The SCI (second control information) and the transmission data according to the present embodiment are transmitted in the same slot or the same subslot. The SCI (second control information) according to the present embodiment is transmitted by at least one of the PSCCH or the PSSCH, and the transmission data is transmitted by the PSSCH.

The terminal device 12B specifies a resource (for example, a resource to which the SCI according to the present embodiment is transmitted) or the like used in the sidelink transmission of the terminal device 12A on the basis of the setting of the control information for the sidelink communication on the basis of the Rx_CG information. The terminal device 12B demodulates and decodes the signal of the specified resource to acquire the SCI according to the present embodiment. The terminal device 12B specifies a resource in which the transmission data is stored from the acquired SCI, and demodulates and decodes the transmission data from the specified resource to acquire.

In the present embodiment, the base station 11A generates the Tx_CG information and the Rx_CG information, but at least one of the Tx_CG information or the Rx_CG information may be generated by another device. For example, the base station 11B may generate at least one of the Tx_CG information or the Rx_CG information in response to a request from the base station 11A. Alternatively, the core network to which the base stations 11A and 11B are connected may generate at least one of the Tx_CG information or the Rx_CG information in response to a request from the base station 11A or the base station 11B.

Third Embodiment

In the third embodiment, the terminal device 12A generates Rx_CG information and transmits the Rx_CG information to the terminal device 12B. The present embodiment is suitable for use in a case where the terminal device 12A is present within the coverage of the base station 11 and the terminal device 12B is present outside the coverage of the base station 11 (that is, the partial coverage case), but can also be applied to a case where the terminal device 12B is present within the coverage of the base station 11 (in the case of in-coverage).

Figure 10:
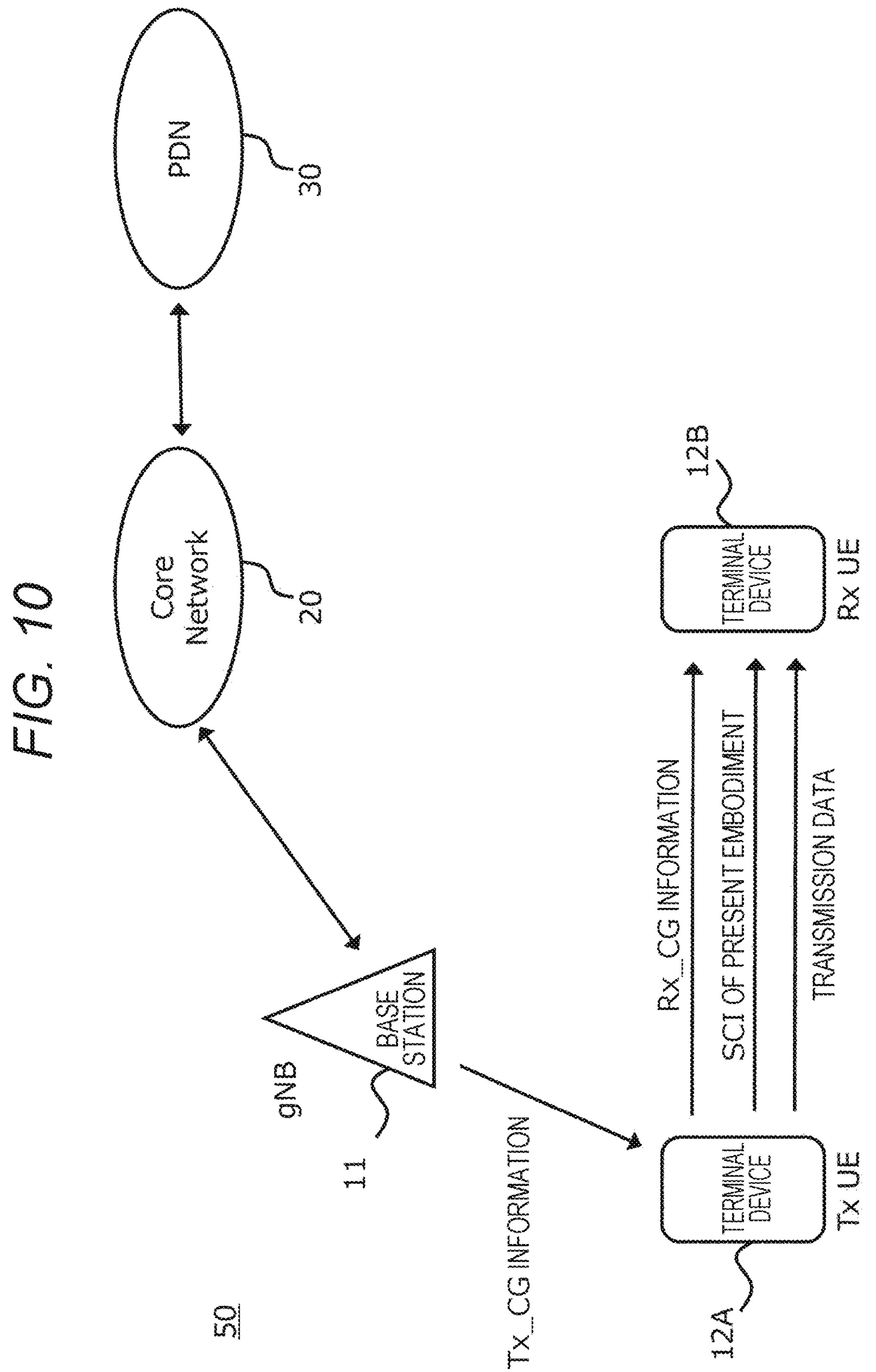
FIG. 10 is a diagram schematically illustrating still another example of the communication system according to the present embodiment.

FIG. 10 is a diagram schematically illustrating an example of a communication system 50 according to the present embodiment. The communication system 50 includes a base station 11 (gNB), a terminal device 12A (Tx UE), a terminal device 12B (Rx UE), a core network 20, and a packet data network (PDN) 30. The terminal device 12A is a terminal device in a cell (coverage) operated by the base station 11. The terminal device 12B is a terminal device outside a cell (coverage) operated by the base station 11.

The block diagram of the base station 11 is the same as that of FIG. 5 of the first embodiment, and some functions of the blocks are extended or changed. The block diagrams of the terminal device 12A and the terminal device 12B are the same as those in FIG. 6 of the first embodiment, and some functions of the blocks are extended or changed. Hereinafter, differences from the first embodiment will be mainly described.

In the first embodiment, the base station 11 transmits the Rx_CG information to the terminal device 12B, but in the third embodiment, the base station 11 does not transmit the Rx_CG information to the terminal device 12A.

When receiving the Tx_CG information from the base station 11 via the reception unit 252, the control unit 250 of the terminal device 12A generates the Rx_CG information for the terminal device 12B. For example, the resource set in the Rx_CG information is a part or all of the resource set in the Tx_CG information. The terminal device 12A can also individually determine resources for sidelink communication with a plurality of reception devices (Rx UEs) on the basis of the Tx_CG information. The transmission unit 251 of the terminal device 12A transmits the Rx_CG information to the terminal device 12B. The Rx_CG information is transmitted by, for example, RRC signaling (such as a sidelink broadcast channel) or physical channel signaling (such as normal sidelink communication). For example, the reception unit 252 of the terminal device 12B receives the Rx_CG information.

The control unit 250 of the terminal device 12A and the control unit 250 of the terminal device 12B perform setting of sidelink communication and perform processing of confirming that the setting is completed. The control unit 250 of the terminal device 12A determines that the setting in the terminal device 12B is completed in a case where the notification information indicating the completion of the setting is received from the terminal device 12B via the reception unit 252. The terminal device 12B may determine that the setting in the terminal device 12A is completed by receiving the Rx_CG information from the terminal device 12A. Alternatively, the transmission unit 251 of the terminal device 12A may transmit notification information indicating that the setting in the terminal device 12A is completed to the terminal device 12B.

Figure 11:
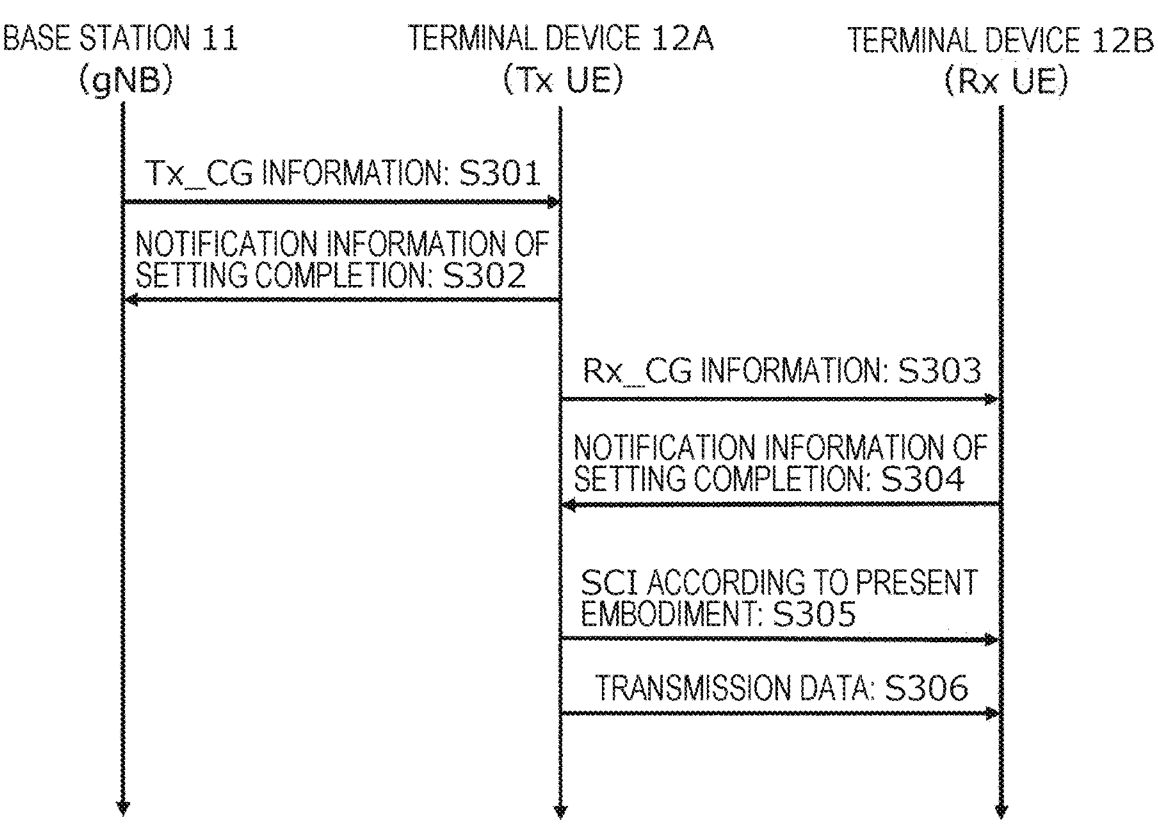
FIG. 11 is an operation flowchart of the communication system in FIG. 10.

FIG. 11 is an operation flowchart of the communication system 50 according to the present embodiment. When determining to permit the terminal device 12A to perform sidelink communication using CG, the base station 11 generates Tx_CG information and transmits the Tx_CG information to the terminal device 12A (S301). The terminal device 12A sets the sidelink communication on the basis of the Tx_CG information, and transmits notification information indicating the completion of the setting to the base station 11 (S302).

The terminal device 12A generates Rx_CG information on the basis of the Tx_CG information received from the base station 11, and transmits the Rx_CG information to the terminal device 12B (S303). The terminal device 12B sets the sidelink communication on the basis of the Rx_CG information, and transmits notification information indicating the completion of the setting to the terminal device 12A (S304).

The terminal device 12A transmits the SCI (second control information) according to the present embodiment and the transmission data to the terminal device 12B by sidelink transmission on the basis of the resource allocated by the Tx_CG information (S305, S306). The SCI (second control information) and the transmission data according to the present embodiment are transmitted in the same slot or the same subslot. The SCI (second control information) according to the present embodiment is transmitted by at least one of the PSCCH or the PSSCH, and the transmission data is transmitted by the PSSCH.

The terminal device 12B specifies a resource (for example, a resource to which the SCI according to the present embodiment is transmitted) or the like used in the sidelink transmission of the terminal device 12A on the basis of the Rx_CG information. The terminal device 12B demodulates and decodes the signal of the specified resource to acquire the SCI according to the present embodiment. The terminal device 12B specifies a resource in which the transmission data is stored from the acquired SCI, and demodulates and decodes the transmission data from the specified resource to acquire.

In the present embodiment, the Rx_CG information is determined by the terminal device 12A, but the present invention is not limited thereto. For example, the base station 11 may determine the Tx_CG information and the Rx_CG information and transmit the information to the terminal device 12A, and the terminal device 12A may transmit (transfer) the received Rx_CG information to the terminal device 12B.

Fourth Embodiment

In the fourth embodiment, the terminal device 12B generates Tx_CG information on the basis of the Rx_CC information acquired from the base station, and transmits the generated Rx_CG information to the terminal device 12A. The present embodiment is suitable for use in a case where the terminal device 12B exists within the coverage of the base station and the terminal device 12A exists outside the coverage of the base station (that is, the partial coverage case), but can also be applied to a case where the terminal device 12A exists within the coverage of the base station (in the case of in-coverage).

Figure 12:
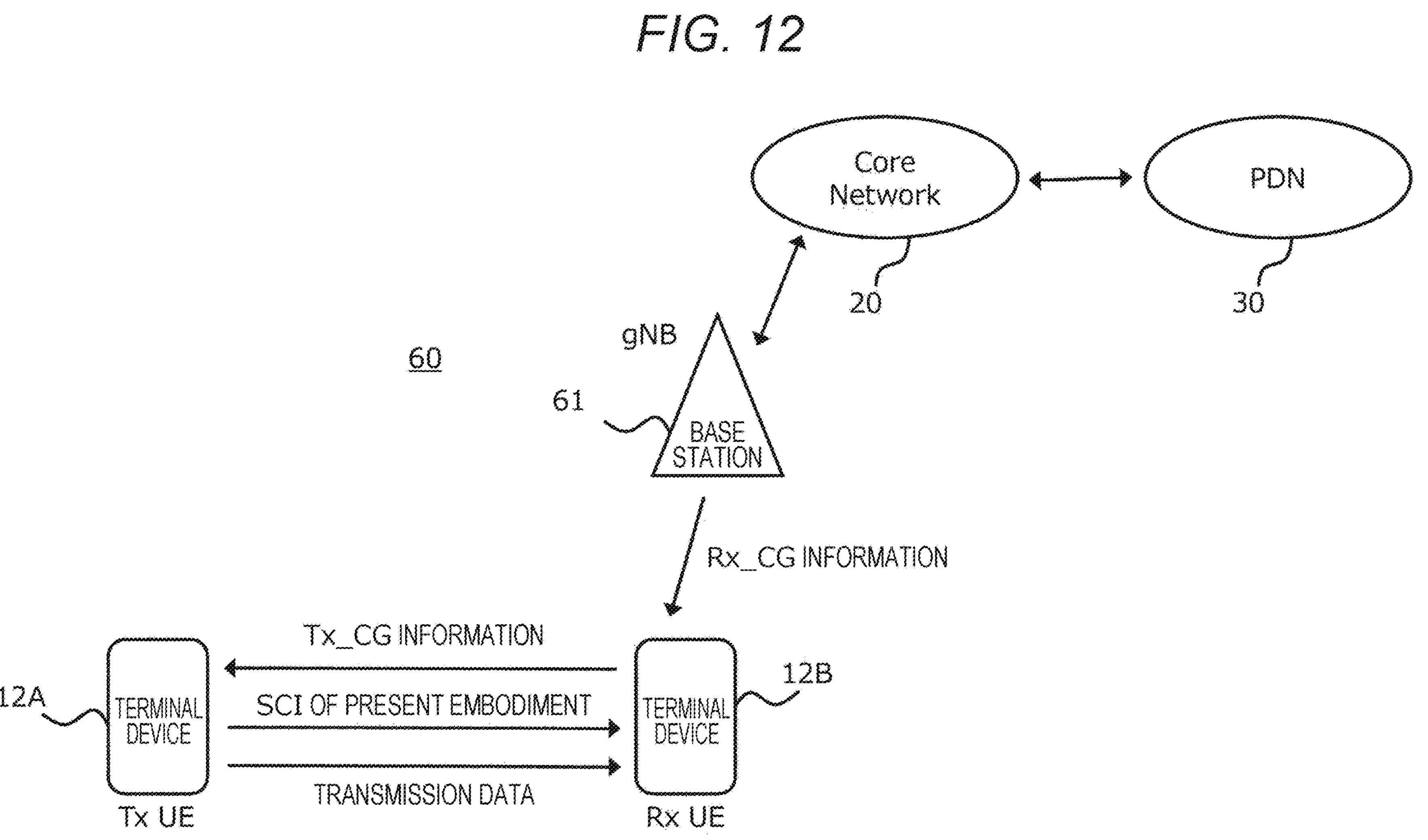
FIG. 12 is a diagram schematically illustrating still another example of the communication system according to the present embodiment.

FIG. 12 is a diagram schematically illustrating an example of a communication system 60 according to the present embodiment. The communication system 40 includes a base station 61 (gNB), a terminal device 12A (Tx UE), a terminal device 12B (Rx UE), a core network 20, and a packet data network (PDN) 30. The terminal device 12B is a terminal device in a cell (coverage) operated by the base station 61. The terminal device 12A is a terminal device outside a cell (coverage) operated by the base station 61.

The block diagram of the base station 61 is the same as that of FIG. 5 of the first embodiment, and some functions of the blocks are extended or changed. The block diagrams of the terminal device 12A and the terminal device 12B are the same as those in FIG. 6 of the first embodiment, and some functions of the blocks are extended or changed. Hereinafter, differences from the first embodiment will be mainly described.

The control unit 150 of the base station 61 generates Rx_CG information for the terminal device 12B, and transmits the Rx_CG information to the terminal device 12B via the transmission unit 251. The control unit 150 of the base station 61 may generate the Rx_CG information, for example, in a case where a request for sidelink communication (sidelink reception) by CG with the terminal device 12A is received from the terminal device 12B. In a case of receiving the request for sidelink communication from the terminal device 12A, the terminal device 12B may transfer (transmit) the above-described request for sidelink reception to the base station 61. Alternatively, in a case where the terminal device 12B determines that there is data to be periodically transmitted to the terminal device 12A, the terminal device may transmit a request for sidelink reception to the base station 61.

When receiving the Rx_CG information from the base station 61 via the reception unit 252, the control unit 250 of the terminal device 12B generates Tx_CG information for the terminal device 12A. For example, the resource set in the Tx_CG information is a part or all of the resource set in the Rx_CG information. That is, the terminal device 12B can individually determine resources for sidelink communication (sidelink reception) with a plurality of transmission devices (Tx UEs) on the basis of the Rx_CG information. The transmission unit 251 of the terminal device 12B transmits the Tx_CG information to the terminal device 12A. The Tx_CG information is transmitted by, for example, RRC signaling (such as a sidelink broadcast channel) or physical channel signaling (such as normal sidelink communication). The reception unit 252 of the terminal device 12A receives the Tx_CG information.

The control unit 250 of the terminal device 12A and the control unit 250 of the terminal device 12B perform the setting of the sidelink communication, and then perform processing of confirming that the setting of the sidelink communication is completed. The control unit 250 of the terminal device 12B determines that the setting in the terminal device 12A is completed in a case where the notification information indicating the completion of the setting is received from the terminal device 12A via the reception unit 252. The terminal device 12A may determine that the setting in the terminal device 12B is completed by receiving the Tx_CG information from the terminal device 12B. Alternatively, the transmission unit 251 of the terminal device 12B may transmit notification information indicating that the setting in the terminal device 12B is completed to the terminal device 12A.

Figures 13, 14:
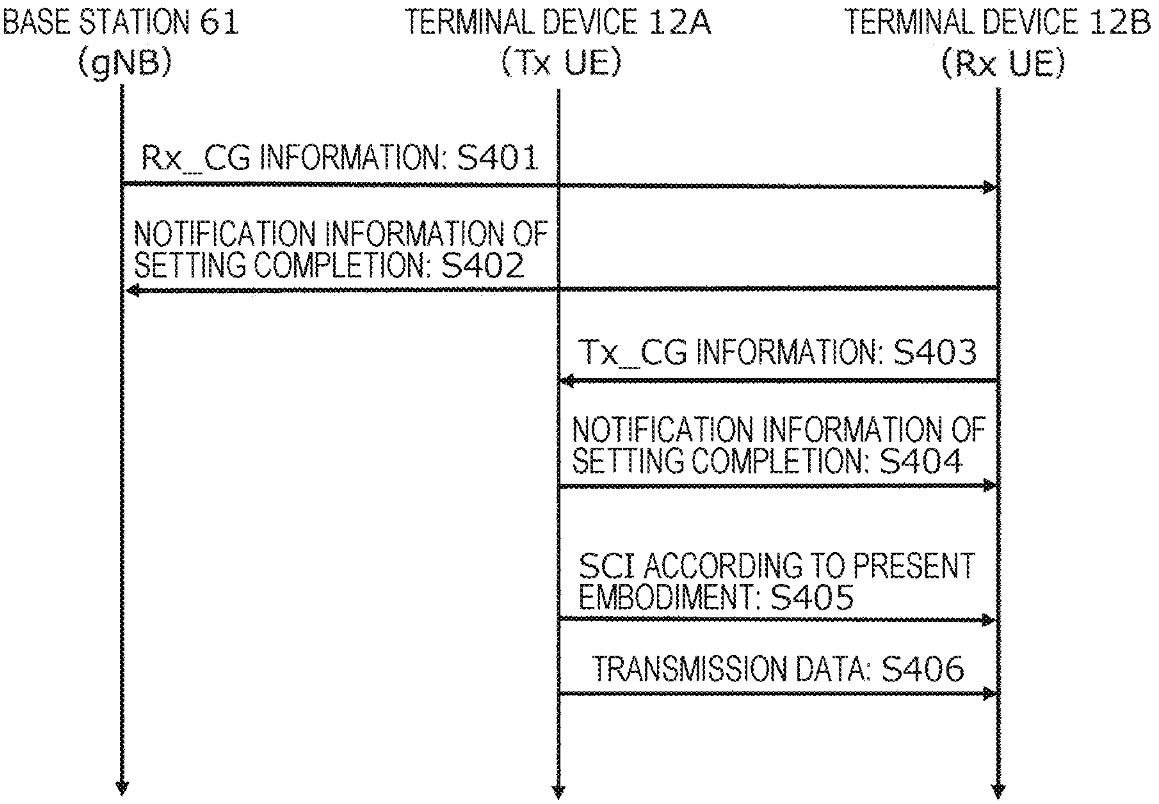
FIG. 13 is an operation flowchart of the communication system in FIG. 12.
FIG. 14 is a diagram schematically illustrating still another example of the communication system according to the present embodiment.

FIG. 13 is an operation flowchart of the communication system 60 according to the present embodiment. When determining to permit the terminal device 12B to perform the sidelink communication (sidelink reception) using the CG of the terminal device 12B, the base station 61 generates the Rx_CG information and transmits the Rx_CG information to the terminal device 12B (S401). The terminal device 12B sets the sidelink communication on the basis of the Rx_CG information, and transmits notification information indicating the completion of the setting to the base station 61 (S402).

The terminal device 12B generates Tx_CG information on the basis of the Rx_CG information received from the base station 61, and transmits the Tx_CG information to the terminal device 12A (S403). The terminal device 12A sets the sidelink communication on the basis of the Tx_CG information, and transmits notification information indicating the completion of the setting to the terminal device 12B (S404).

The terminal device 12A transmits the SCI (second control information) according to the present embodiment and the transmission data to the terminal device 12B by sidelink transmission on the basis of the resource allocated by the Tx_CG information (S405, S406). The SCI (second control information) and the transmission data according to the present embodiment are transmitted in the same slot or the same subslot. The SCI (second control information) according to the present embodiment is transmitted by at least one of the PSCCH or the PSSCH, and the transmission data is transmitted by the PSSCH.

The terminal device 12B specifies a resource (for example, a resource to which the SCI according to the present embodiment is transmitted) or the like used in the sidelink transmission of the terminal device 12A on the basis of the Rx_CG information. The terminal device 12B demodulates and decodes the signal of the specified resource to acquire the SCI according to the present embodiment. The terminal device 12B specifies a resource in which the transmission data is stored from the acquired SCI, and demodulates and decodes the transmission data from the specified resource to acquire.

In the present embodiment, the Tx_CG information is determined by the terminal device 12B, but the present invention is not limited thereto. For example, the base station 61 may determine the Tx_CG information and the Rx_CG information and transmit the information to the terminal device 12B, and the terminal device 12B may transmit (transfer) the received Tx_CG information to the terminal device 12B.

Fifth Embodiment

In the fifth embodiment, the terminal device 12A generates Rx_CG information for the terminal device 12B on the basis of information (Tx_CC information) set in advance, and transmits the Rx_CG information to the terminal device 12B. The fifth embodiment is suitable for use in a case where both the terminal device 12A (Tx UE) and the terminal device 12B (Rx UE) are out of coverage (that is, the out-of-coverage case), but can also be applied to a case of in-coverage or partial coverage.

FIG. 14 is a diagram schematically illustrating an example of a communication system 70 according to the present embodiment. The communication system 70 includes a terminal device 12A (Tx UE) and a terminal device 12B (Rx UE). In the example of FIG. 14, both the terminal device 12A and the terminal device 12B are out of coverage of the base station.

The block diagrams of the terminal device 12A and the terminal device 12B are the same as those in FIG. 6 of the first embodiment, and some functions of the blocks are extended or changed. Hereinafter, differences from the first embodiment will be mainly described.

In the terminal device 12A, Tx_CG (setting information related to CG) is pre-configured and stored in the storage unit 240. When determining to execute the sidelink communication by the CG, the control unit 250 of the terminal device 12A determines the setting related to the CG for the terminal device 12B of the communication counterpart on the basis of the Tx_CG information and generates the Rx_CG information. The transmission unit 251 of the terminal device 12A transmits the Rx_CG information to the terminal device 12B. The Rx_CG information is transmitted by, for example, RRC signaling (such as a sidelink broadcast channel) or physical channel signaling (such as normal sidelink communication). Furthermore, the control unit 250 of the terminal device 12A sets sidelink communication by CG.

When the terminal device 12A generates the Rx_CG information, the use state of the resource (resource allocated by Tx_CG) may be sensed. By performing sensing, it is possible to select a resource with low interference, so that high-quality sidelink communication can be realized.

When receiving the Rx_CG information from the terminal device 12A via the reception unit 252, the control unit 250 of the terminal device 12B sets sidelink communication by CG on the basis of the Rx_CG information. The transmission unit 251 of the terminal device 12B transmits notification information indicating the completion of the setting of the sidelink communication to the terminal device 12A.

The control unit 250 of the terminal device 12A and the control unit 250 of the terminal device 12B mutually perform processing of confirming that the setting of the sidelink communication is completed. The control unit 250 of the terminal device 12A determines that the setting in the terminal device 12B is completed in a case where the notification information indicating the completion of the setting is received from the terminal device 12B via the reception unit 252. For example, the terminal device 12B may determine that the setting in the terminal device 12A is completed by receiving the Rx_CG information from the terminal device 12A. Alternatively, the transmission unit 251 of the terminal device 12A may transmit notification information indicating that the setting in the terminal device 12A is completed to the terminal device 12B.

Figure 15:
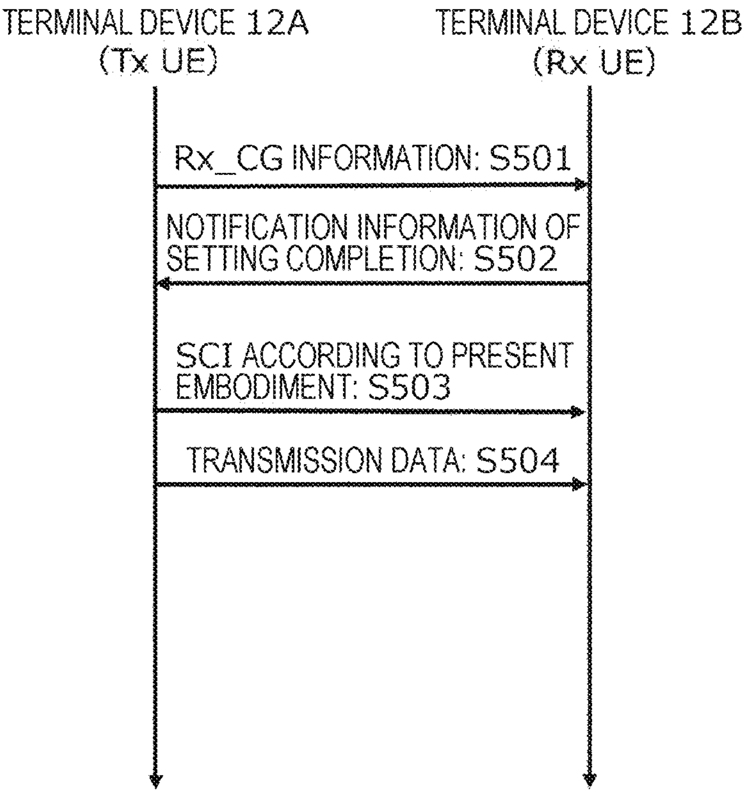
FIG. 15 is an operation flowchart of the communication system in FIG. 14.

FIG. 15 is an operation flowchart of the communication system 70 according to the present embodiment. When determining to perform sidelink communication (sidelink transmission) using CG, the terminal device 12A generates Rx_CG information and transmits the Rx_CG information to the terminal device 12B (S501). The terminal device 12B sets the sidelink communication on the basis of the Rx_CG information, and transmits notification information indicating the completion of the setting to the terminal device 12A (S502).

The terminal device 12A transmits the SCI (second control information) according to the present embodiment and the transmission data to the terminal device 12B by sidelink transmission on the basis of the resource allocated by the Tx_CG information (S503, S504). The SCI (second control information) and the transmission data according to the present embodiment are transmitted in the same slot or the same subslot. The SCI (second control information) according to the present embodiment is transmitted by at least one of the PSCCH or the PSSCH, and the transmission data is transmitted by the PSSCH.

The terminal device 12B specifies a resource (for example, a resource to which the SCI according to the present embodiment is transmitted) or the like used in the sidelink transmission of the terminal device 12A on the basis of the Rx_CG information. The terminal device 12B demodulates and decodes the signal of the specified resource to acquire the SCI according to the present embodiment. The terminal device 12B specifies a resource in which the transmission data is stored from the acquired SCI, and demodulates and decodes the transmission data from the specified resource to acquire.

Sixth Embodiment

In the sixth embodiment, the terminal device 12B generates Tx_CG information for the terminal device 12A on the basis of information (Rx_CG information) set in advance, and transmits the Tx_CG information to the terminal device 12A. The sixth embodiment is suitable for use in a case where both the terminal device 12A (Tx UE) and the terminal device 12B (Rx UE) are out of coverage of the base station (that is, the out-of-coverage case), but can also be applied to a case of in-coverage or partial coverage.

Figure 16:
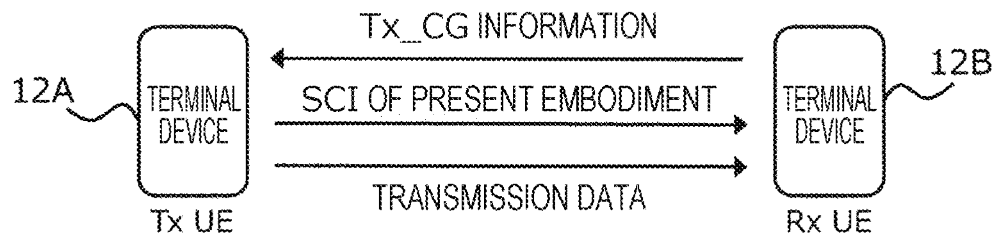
FIG. 16 is a diagram schematically illustrating still another example of the communication system according to the present embodiment.

FIG. 16 is a diagram schematically illustrating an example of a communication system 80 according to the present embodiment. The communication system 80 includes a terminal device 12A (Tx UE) and a terminal device 12B (Rx UE). In the example of FIG. 16, both the terminal device 12A and the terminal device 12B are out of coverage of the base station.

The block diagrams of the terminal device 12A and the terminal device 12B are the same as those in FIG. 6 of the first embodiment, and some functions of the blocks are extended or changed. Hereinafter, differences from the first embodiment will be mainly described.

In the terminal device 12B, Rx_CG (setting information related to CG) is pre-configured and stored in the storage unit 240. When determining to perform the sidelink communication (sidelink reception) by the CG, the control unit 250 of the terminal device 12B determines the setting related to the CG for the terminal device 12A of the communication counterpart on the basis of the Rx_CG information and generates the Tx_CG information. The transmission unit 251 of the terminal device 12B transmits the Tx_CG information to the terminal device 12A. The Tx_CG information is transmitted by, for example, RRC signaling (such as a sidelink broadcast channel) or physical channel signaling (such as normal sidelink communication). Furthermore, the control unit 250 of the terminal device 12B performs setting of sidelink communication (sidelink reception) by the CG.

When the terminal device 12B generates the Tx_CG information, the use state of the resource (resource allocated by Rx_CG) may be sensed. By performing sensing, it is possible to select a resource with low interference, so that high-quality sidelink communication can be realized.

When receiving the Tx_CG information from the terminal device 12B via the reception unit 252, the control unit 250 of the terminal device 12A sets sidelink communication by CG on the basis of the Tx_CG information. The transmission unit 251 of the terminal device 12A transmits notification information indicating the completion of the setting of the sidelink communication to the terminal device 12B.

The control unit 250 of the terminal device 12A and the control unit 250 of the terminal device 12B mutually perform processing of confirming that the setting of the sidelink communication is completed. The control unit 250 of the terminal device 12B determines that the setting in the terminal device 12A is completed in a case where the notification information indicating the completion of the setting is received from the terminal device 12A via the reception unit 252. For example, the terminal device 12A may determine that the setting in the terminal device 12B is completed by receiving the Tx_CG information from the terminal device 12B. Alternatively, the transmission unit 251 of the terminal device 12B may transmit notification information indicating that the setting in the terminal device 12B is completed to the terminal device 12A.

Figure 17:
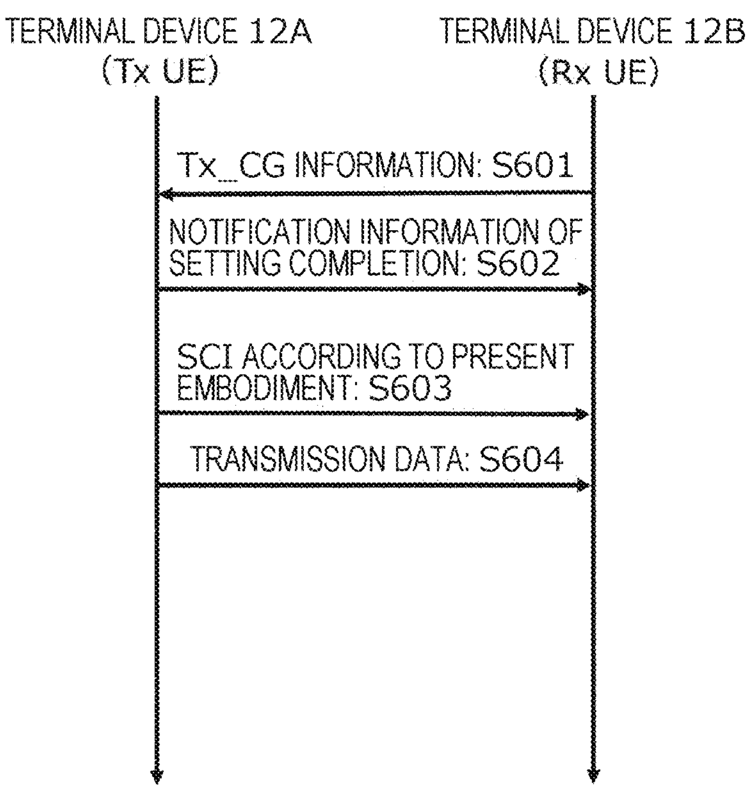
FIG. 17 is an operation flowchart of the communication system in FIG. 16.

FIG. 17 is an operation flowchart of the communication system 80 according to the present embodiment. When determining to perform sidelink communication (sidelink reception) using CG, the terminal device 12B generates Tx_CG information on the basis of the Rx_CG information and transmits the Tx_CG information to the terminal device 12A (S601). The terminal device 12A sets the sidelink communication on the basis of the Tx_CG information, and transmits notification information indicating the completion of the setting to the terminal device 12B (S602).

The terminal device 12A transmits the SCI (second control information) according to the present embodiment and the transmission data to the terminal device 12B by sidelink transmission on the basis of the resource allocated by the Tx_CG information (S603, S604). The SCI (second control information) and the transmission data according to the present embodiment are transmitted in the same slot or the same subslot. The SCI (second control information) according to the present embodiment is transmitted by at least one of the PSCCH or the PSSCH, and the transmission data is transmitted by the PSSCH.

The terminal device 12B specifies a resource (for example, a resource to which the SCI according to the present embodiment is transmitted) or the like used in the sidelink transmission of the terminal device 12A on the basis of the Rx_CG information. The terminal device 12B demodulates and decodes the signal of the specified resource to acquire the SCI according to the present embodiment. The terminal device 12B specifies a resource in which the transmission data is stored from the acquired SCI, and demodulates and decodes the transmission data from the specified resource to acquire.

<Control Information Reduced From Conventional SCI>

Various methods can be used as a method in which the terminal device 12A (Tx UE) and the terminal device 12B (Rx UE) recognize or grasp the control information included in the SCI according to the present embodiment (which control information is reduced in the SCI according to the present embodiment from the conventional SCI format). Note that, as described above, the control information to be deleted is included in the Rx_CG information, for example, as the first control information, and a notification is provided to the terminal device 12B. The control information included in the SCI according to the present embodiment corresponds to the second control information.

(Example 1) The terminal device 12A and the terminal device 12B are explicitly notified of which control information is to be reduced from the conventional SCI format by CG information (Tx_CG information, Rx_CG information) or another RRC signaling.

(Example 2) One or more SCI formats different from the conventional one are defined, and the terminal device 12A and the terminal device 12B are explicitly notified of the applied SCI format (the format of the SCI according to the present embodiment) by CG information (Tx_CG information, Rx_CG information) or another RRC signaling.

(Example 3) The terminal device 12A and the terminal device 12B are notified of information indicating control information (control information included in the SCI according to the present embodiment) that remains without being reduced in the conventional SCI by CG information (Tx_CG information, Rx_CG information) or another RRC signaling. The terminal device 12A and the terminal device 12B implicitly recognize that the control information other than the notified control information in the conventional SCI is reduced from the conventional SCI. Alternatively, a notification of information indicating the control information reduced from the SCI may be provided to the terminal device 12A and the terminal device 12B by CG information (Tx_CG information, Rx_CG information) or another RRC signaling. In a case where the setting value of the control information is not set by RRC, a predetermined value (default value) defined in advance may be used as the control information reduced from the SCI.

Examples of the RRC signaling described in Examples 1 to 3 include system information broadcast from the base station, dedicated information individually configured for each UE from the base station, a sidelink broadcast channel transmitted from a predetermined UE, and the like.

Note that the reduction of the control information from the conventional SCI includes both a case where the item of the control information is reduced from the conventional SCI format and a case where the payload size of the control information is set to 0 bit in the conventional SCI format.

<Update of Control Information Reduced From Conventional SCI>

The control information (first control information) reduced from the conventional SCI may be updated on the reception device side by being periodically or aperiodically added to the SCI according to the present embodiment.

[Case of Periodic Update]

(Example 1) SCI including reduced control information is transmitted every predetermined number of times of transmission or every predetermined time (for example, every predetermined number of slots, or every predetermined number of subframes). For example, in a case where the sidelink transmission is performed in a cycle of 10 slots (once every 10 slots) by the Tx_CG information and the update is performed once every 5 times of sidelink transmission, the SCI including the reduced control information (control information to be updated) is transmitted in a cycle of 50 slots (once every 50 slots).

Different SCI formats can be defined as the SCI format of the SCI (second control information) according to the present embodiment and the SCI format of the SCI (SCI for periodically updating the reduced control information) additionally including the reduced control information (first control information). The format of the SCI (SCI for periodically updating the reduced control information) including the reduced control information may be the same as the format of the conventional SCI. The SCI format of the SCI including the reduced control information also corresponds to the first SCI format as an example, and the SCI format of the SCI (second control information) according to the present embodiment corresponds to the second SCI format as an example.

Note that, in a case where the terminal device 12 (Tx UE) does not update the reduced control information, the reduced control information may not be transmitted. In that case, the SCI according to the present embodiment can be continuously used.

(Example 2) A resource for periodic update different from the resource set by the Tx_CG information or the Rx_CC information is set, and the SCI including the reduced control information is transmitted through the update resource. Note that, in a case where the reduced control information is not updated, the terminal device 12 (Tx UE) does not need to transmit anything using the update resource. The terminal device 12B (Rx UE) recognizes that there is no update of the reduced control information (first control information) in a case where what is not transmitted to the update resource.

[Case of Aperiodic Update]

Information regarding an update of the reduced control information is transmitted by using conventional sidelink transmission. For example, it is transmitted by RRC signaling or physical layer signaling (using physical resources in PSCCH or PSSCH). The information regarding the reduced update of the control information is transmitted before the transmission of the SCI and the transmission data according to the present embodiment.

The above periodic or aperiodic update may be instructed by the base station or may be performed autonomously by the Tx UE or the Rx UE.

As an effect of the update, for example, in a case where the above-described update is instructed by the base station, the base station updates the sidelink communication according to the situation of the sidelink communication between other UEs. Furthermore, for example, in a case where the above-described update is autonomously performed by the Tx UE or the Rx UE, the Tx UE or the Rx UE can detect that there is a change in the use state of the resource by another UE by sensing, and can update the physical resource used for the sidelink communication.

Specific Example of Control Information Reduced from Conventional SCI

Hereinafter, a specific example of the control information (first control information) reduced from the conventional SCI will be described.

Example 1: Case of Reducing Control Information Used for Predetermined Function or Predetermined Purpose in SCI In this example, among the first SCI and/or the second SCI, the control information used for a predetermined function or a predetermined purpose is reduced from the SCI. For example, the control information to be reduced is as follows.

(1) Control Information Regarding Physical Resource Mapping of PSSCH

The control information specifically includes at least one of a frequency resource assignment, a time resource assignment, a PSFCH overhead indication, a DMRS pattern, or a number of DMRS port in the first SCI. The reduction of the control information is suitable particularly in a case where the PSSCH is transmitted using a periodic resource. In the PSSCH, at least one of the second SCI or the transmission data is mapped.

Note that, in the Rx_CG information, the Tx_CG information, or another RRC signaling, in addition to the control information reduced from the SCI, information regarding the period of the time resource (for example, a cycle of 10 ms or the like) and information regarding the frequency hopping of the frequency resource (here, the frequency hopping uses different frequency resources for each transmission of the PSSCH to obtain a frequency diversity effect) can be set.

(2) Control Information Necessary for Demodulating and/or Decoding PSSCH

The control information specifically includes at least one of a DMRS pattern, a number of DMRS port, a modulation and coding scheme, or an additional MCS table indicator in the first SCI. In the PSSCH, at least one of the second SCI or the transmission data is mapped.

In addition, the control information includes at least one of a HARQ process number, a new data indicator, or a redundancy version in the second SCI.

The reduction of the control information is particularly preferable in a case where the transmission parameters (modulation scheme, coding rate, DMRS pattern, DMRS port number, information regarding HARQ, and the like) of PSSCH do not change for each sidelink transmission.

Note that, in the Tx_CC information, the Rx_CC information, or another RRC signaling, in addition to the information reduced from the SCI, other transmission parameters such as information regarding the scrambling of the PSSCH, the non-orthogonal access scheme (NOMA; non-orthogonal multiple access), and information regarding PSSCH interleaving may be set.

In addition, the physical resource and the HARQ process number can be associated with each other in the Tx_CC information, the Rx_CC information, or another RRC signaling. For example, the HARQ process number of the PSSCH to be transmitted is calculated on the basis of the slot number to which the PSSCH is mapped.

(3) Control Information that does not Need to be Changed Each Time Transmission is Performed in a Case where a Predetermined Use Case or a Predetermined Traffic is Assumed Specifically, the control information includes at least one of the following control information other than the control information (that is, the following control information may be changed each time it is transmitted).

HARQ process number in the second SCI
New data indicator
Redundancy version
CSI request Note that, in a case where the terminal device 12A (Tx UE) and the terminal device 12B (Rx UE) transmit and receive data of a plurality of use cases or a plurality of traffic, a plurality of pieces of CG information for each of the terminal device 12A and the terminal device 12B can be set. That is, the Tx_CC information and the Rx_CC information can be individually set according to the use case or the traffic.

(4) Information Indicating Terminal Device 12A (Tx UE) and Terminal Device 12B (Rx UE)

In a specific example, the control information includes at least one of a source ID or a destination ID in the second SCI.

The reduction of the control information of the source ID and the destination ID is particularly suitable for sidelink transmission by unicast or groupcast in which the terminal device 12A (Tx UE) and the terminal device 12B (Rx UE) are always fixed.

(5) Control Information Necessary Only for Terminal Device 12B (Rx UE)

This control information includes, for example, control information other than the control information used for sensing. The control information used in the sensing is control information required by all the other terminal devices (UEs) other than the terminal device 12B (Rx UE), and all the other terminal devices can grasp the use state of the resource by the control information.

Specifically, the control information includes at least one of the following control information other than the control information (that is, the following control information is information used for sensing).

Priority in the first SCI
Frequency resource assignment
Time resource assignment
Resource reservation period Example 2: A Case where a First SCI of the SCI According to the Present Embodiment is the Same as a Conventional First SCI, and a Second SCI of the SCI According to the Present Embodiment Corresponds to a SCI Obtained by Reducing a Part or all of the Conventional Second SCI The first SCI is received for the purpose of performing sensing by a terminal device (UE) other than the terminal device 12B (Rx UE). Therefore, in a case where terminal devices (UEs) using the format of the conventional first SCI coexist, when a format different from the format of the conventional first SCI is used for the first SCI, it is difficult for the coexisting terminal devices (UEs) to receive the first SCI. In particular, in a case where the terminal device (UE) is a conventionally released terminal device (UE), the first SCI in the new format cannot be received. Therefore, the same format (that is, the SCI format 1-A) as the conventional format is used for the first SCI, and a part or all of the second SCI is reduced. A specific example of the control information to be reduced from the second SCI is the same as that in Example 1. This enables coexistence with a terminal device (UE) using the format of the conventional first SCI.

Others

In the above description, an example has been described in which the data amount of the SCI transmitted from the terminal device 12A (Tx UE) to the terminal device 12B (Rx UE) is reduced in a case where sidelink communication by CG is performed, but the present embodiment is not limited to this example.

For example, the present embodiment can be extended and applied to resource allocation from a base station in normal sidelink communication.

The base station transmits downlink control information (DCI) including scheduling information for allocating a resource for sidelink communication to a terminal device (Tx UE) through a PDCCH. The terminal device (Tx UE) performs sidelink communication with the terminal device (Rx UE) using the allocated resources. At this time, the terminal device (Tx UE) transmits the SCI to the terminal device (Rx UE) together with the transmission data. As a large difference from sidelink communication by CG, CG information is used to set a plurality of periodic resources, whereas scheduling information by DCI is used to schedule one resource (resource of one transmission). In a case where the present embodiment is applied to normal sidelink communication, the above-described CG information (Tx_CG information, Rx_CG information) can be replaced with DCI.

Specifically, in the third embodiment or the fourth embodiment described above, DCI is transmitted from the base station to the terminal device 12A (Tx UE) and/or the terminal device 12B (Rx UE) instead of CG information (Tx_CG information, Rx_CG information). The DCI includes scheduling information for allocating a resource for sidelink communication.

Furthermore, in the third embodiment or the fourth embodiment, the Rx_CG information or the Tx_CG information is transmitted and received between the terminal device 12A (Tx UE) and the terminal device 12B (Rx UE), but this transmission and reception may also be replaced with physical layer signaling (for example, SCI). Note that, in the fifth or sixth embodiment described above, transmission and reception of the Rx_CG information or the Tx_CG information may be replaced with physical layer signaling (for example, SCI).

Note that the above effects are not necessarily limited, and any of the effects described in the present specification or other effects that can be obtained from the present specification may be exhibited in addition to or in place of the above effects.

Note that the above-described embodiments illustrate examples for embodying the present disclosure, and the present disclosure can be implemented in various other forms. For example, various modifications, substitutions, omissions, or combinations thereof can be made without departing from the gist of the present disclosure. Such modifications, substitutions, omissions, and the like are also included in the scope of the present disclosure and are similarly included in the invention described in the claims and the equivalent scopes thereof.

Furthermore, the effects of the present disclosure described in the present specification are merely exemplification, and other effects may be provided.

Note that the present disclosure can have the following configurations.

Item 1

A communication device that performs sidelink communication with a transmission device, the communication device including:

a control unit that performs a setting related to a configured grant on the basis of first setting information; and a reception unit that receives transmission data transmitted from the transmission device through the sidelink communication on the basis of the setting related to the configured grant.

Item 2

The communication device according to claim 1, further including a transmission unit that transmits notification information indicating that the setting related to the configured grant is performed, in which the reception unit receives the transmission data transmitted from the transmission device through the sidelink communication after the notification information is transmitted.

Item 3

The communication device according to claim 1, in which the setting related to the configured grant is a setting of first control information out of the first control information and second control information necessary for the reception unit to receive the transmission data, and the reception unit receives the second control information through the sidelink communication, and receives the transmission data transmitted through the sidelink communication on the basis of the second control information and the first control information.

Item 4

The communication device according to any one of items 1 to 3, in which the reception unit receives the first setting information from a base station.

Item 5

The communication device according to claim 4, further including a transmission unit that transmits second setting information for the transmission device to perform the setting related to the configured grant.

Item 6

The communication device according to claim 5, in which the control unit generates the second setting information for the transmission device to perform the setting related to configured grant communication on the basis of the first setting information, the transmission unit transmits the second setting information to the transmission unit, and the reception unit performs the sidelink communication with the transmission device after the second setting information is transmitted.

Item 7

A communication device including:

a control unit that confirms that a setting related to a configured grant is made in a reception device; and a transmission unit that transmits transmission data to the reception device through sidelink communication after it is confirmed that the setting related to the configured grant is made in the reception device.

Item 8

The communication device according to claim 7, in which the setting related to the configured grant is a setting of first control information out of the first control information and second control information necessary for the reception device to receive the transmission data, and the transmission unit transmits the second control information and the transmission data to the reception device through the sidelink communication.

Item 9

The communication device according to claim 8, in which the transmission unit transmits first setting information for the reception device to perform the setting related to the configured grant.

Item 10

The communication device according to claim 9, in which the control unit receives second setting information including allocation information of resources available for the sidelink communication from a base station, and generates the first setting information on the basis of the second setting information.

Item 11

The communication device according to item 10, in which the second setting information includes periodic allocation information of the resources.

Item 12

The communication device according to any one of items 8 to 11, in which the control unit receives second setting information including allocation information of resources available for the sidelink communication from the reception device, and transmits the second control information and the transmission data on the basis of the second setting information.

Item 13

The communication device according to any one of items 8 to 12, in which the control unit updates the first control information, and the transmission unit transmits the first control information updated, the second control information, and the transmission data through the sidelink communication.

Item 14

The communication device according to item 13, in which the transmission unit transmits the first control information updated and the second control information in a first format in a case of transmitting the first control information updated and the second control information, and the transmission unit transmits the second control information in a second format different from the first format in a case of transmitting the second control information without transmitting the first control information updated.

Item 15

The communication device according to any one of items 8 to 14, in which the control unit updates the first control information, and the transmission unit transmits the first control information updated before the sidelink communication.

Item 16

The communication device according to any one of items 8 to 15, in which the first control information includes information regarding a resource to which at least one of the transmission data or the second control information is mapped.

Item 17

The communication device according to any one of items 8 to 16, in which the first control information includes information for demodulating and decoding at least one of the transmission data or the second control information.

Item 18

A base station including:

a control unit that generates first setting information for performing a setting of a configured grant for a reception device that performs sidelink communication with a transmission device; and a transmission unit that transmits the first setting information to the reception device, the transmission device, or another base station capable of communicating with the transmission device.

Item 19

The base station according to item 18, in which the setting related to the configured grant in the reception device is a setting of first control information among the first control information and second control information used by the reception device to receive transmission data transmitted from the transmission device through the sidelink communication, and the transmission unit transmits, to the transmission device or the another base station, second setting information for performing the setting related to the configured grant necessary for transmitting the second control information together with the transmission data through the sidelink communication in the transmission device.

Item 20

A communication method executed by a communication device, the communication method including:

confirming that a setting related to a configured grant is performed in a reception device; and transmitting transmission data to the reception device through sidelink communication after it is confirmed that the setting related to the configured grant is performed in the reception device.

Item 21

A communication method executed by a communication device, the communication method including:

performing a setting related to a configured grant with a transmission device on the basis of first setting information; and receiving transmission data transmitted through the sidelink communication from the transmission device on the basis of the setting related to the configured grant.

Item 22

A communication method executed by a base station, the communication method including:

a control unit that generates first setting information for performing a setting of a configured grant for a reception device that performs sidelink communication with a transmission device; and transmitting the first setting information to the reception device, the transmission device, or another base station capable of communicating with the transmission device.

REFERENCE SIGNS LIST

10 Communication system
11 Base station
11A Base station
11B Base station
12 Terminal device (communication device)
12A Terminal device (transmission device)
12B Terminal device (reception device)
20 Core network
40 Communication system
50 Communication system
60 Communication system
61 Base station
70 Communication system
80 Communication system
110 Antenna
120 Wireless communication unit
121 Signal transmission unit
122 Signal reception unit
130 Network communication unit
140 Storage unit
150 Control unit
151 Transmission unit
152 Reception unit
210 Antenna
220 Wireless communication unit
221 Signal transmission unit
222 Signal reception unit
240 Storage unit
250 Control unit
251 Transmission unit
252 Reception unit
1000 Communication system
1001 Base station
1002A Terminal device
1002B Terminal device

The invention claimed is:

1. A communication device that performs sidelink communication with a transmission device, the communication device comprising:

a transceiver configured for sidelink communications; and control circuitry configured to perform a process for processing sidelink control information (SCI) related to a configured grant (CG), wherein the process comprises:

determining whether a first part of the SCI is stored in the communication device to generate a determination result;

transmitting the determination result to the transmission device;

based on the determination result indicating that the first part of the SCI is stored in the communication device, performing a first resource allocation process that includes:

receiving a second part of the SCI, without the first part of the SCI, from the transmission device;

performing a first resource allocation process for the sidelink communications based on the stored first part of the SCI and the received second part of the SCI; and performing the sidelink communications to receive transmission data from the transmission device based on the first resource allocation process, or based on the determination result indicating that the first part of the SCI is not stored in the communication device, performing a second resource allocation process that includes:

receiving the first and second parts of the SCI from the transmission device:

performing a second resource allocation process for the sidelink communications based on the received first and second parts of the SCI; and performing the sidelink communications to receive the transmission data from the transmission device based on the second resource allocation process.

2. The communication device according to claim 1, wherein the first part of the SCI includes information for demodulating and decoding at least one of the transmission data or the second part of the SCI.

3. The communication device according to claim 1, wherein the first resource allocation process includes receiving an update to the first part of the SCI from the transmission device as part of the sidelink communications.

4. The communication device according to claim 1, wherein, in the first resource allocation process, the first part of the SCI is received from a base station.

5. The communication device according to claim 4, wherein the first resource allocation process further comprises relaying transmitter CG information from the base station to the transmission device before receiving the second part of the SCI from the transmission device.

6. The communication device according to claim 1, wherein, in the first resource allocation process, the first part of the SCI is received from the another communication device prior to transmitting the determination result to another communication device.

7. The communication device according to claim 1, wherein a format of the second part of the SCI is different from a format of the first part of the SCI.

8. The communication device according to claim 1, wherein the first resource allocation process includes receiving an update to the first part of the SCI from the transmission device prior to receiving the transmission data.

9. The communication device according to claim 1, wherein the first resource allocation process includes receiving an update to the first part of the SCI from the transmission device along with the transmission data.

10. A communication device that performs sidelink communication with a reception device, the communication device comprising:

a transceiver configured for sidelink communications; and control circuitry configured to perform a process for processing sidelink control information (SCI) related to a configured grant (CG), wherein the process comprises:

receiving a determination result from the reception device, the determination result indicating whether a first part of the SCI is stored in the reception device;

based on the determination result indicating that the first part of the SCI is stored in the reception device:

performing a first resource allocation process that includes transmitting a second part of the SCI without the first part of the SCI to the reception device to enable the reception device to allocate resources for the sidelink communications based on the stored first part of the SCI and the received second part of the SCI; and performing the sidelink communications to transmit transmission data to the reception device based on the first resource allocation process; or based on the determination result indicating that the first part of the SCI is not stored in the reception device:

performing a second resource allocation process that includes transmitting the first and second parts of the SCI to the reception device to enable the reception device to allocate the resources for the sidelink communications based on the received first and second parts of the SCI; and performing the sidelink communications to transmit the transmission data to the reception device based on the second resource allocation process.

11. The communication device according to claim 10, wherein, in the first resource allocation process, the first part of the SCI is received by the reception device from a base station, and wherein the first resource allocation process receiving transmitter CG information from the base station via the reception device before transmitting the second part of the SCI to the reception device.

12. The communication device according to claim 11, wherein the first part of the SCI includes information for demodulating and decoding at least one of the transmission data or the second part of the SCI.

13. The communication device according to claim 10, wherein the first resource allocation process includes transmitting an update to the first part of the SCI to the reception device along with the transmission data.

14. The communication device according to claim 10, wherein the first resource allocation process generating the second part of the SCI based on control information received directly or indirectly from a base station.

15. The communication device according to claim 14, wherein the control information from the base station includes periodic allocation information of the resources.

16. The communication device according to claim 10, wherein a format of the second part of the SCI is different from a format of the first part of the SCI.

17. The communication device according to claim 10, wherein the first resource allocation process includes transmitting an update to the first part of the SCI to the reception device prior to transmitting the transmission data.

18. A communication method executed by a communication device that performs sidelink communication with a transmission device, the communication method comprising:

performing a process for processing sidelink control information (SCI) related to a configured grant (CG), wherein the process comprises:

determining whether a first part of the SCI is stored in the communication device to generate a determination result:

transmitting the determination result to the transmission device;

based on the determination result indicating that the first part of the SCI is stored in the communication device, performing a first resource allocation process that includes:

receiving a second part of the SCI without the first part of the SCI, from the transmission device;

performing a first resource allocation process for the sidelink communications based on the stored first part of the SCI and the received second part of the SCI; and performing the sidelink communications to receive transmission data from the transmission device based on the first resource allocation process, or based on the determination result indicating that the first part of the SCI is not stored in the communication device, performing a second resource allocation process that includes:

receiving the first and second parts of the SCI from the transmission device;

performing a second resource allocation process for the sidelink communications based on the received first and second parts of the SCI; and performing the sidelink communications to receive the transmission data from the transmission device based on the second resource allocation process.

19. A communication method executed by a communication device that performs sidelink communication with a reception device, the communication method comprising:

performing a process for processing sidelink control information (SCI) related to a configured grant (CG), wherein the process comprises:

receiving a determination result from the reception device, the determination result indicating whether a first part of the SCI is stored in the reception device;

based on the determination result indicating that the first part of the SCI is stored in the reception device:

performing a first resource allocation process that includes transmitting a second part of the SCI without the first part of the SCI to the reception device to enable the reception device to allocate resources for the sidelink communications based on the stored first part of the SCI and the received second part of the SCI; and performing the sidelink communications to transmit transmission data to the reception device based on the first resource allocation process; or based on the determination result indicating that the first part of the SCI is not stored in the reception device:

performing a second resource allocation process that includes transmitting the first and second parts of the SCI to the reception device to enable the reception device to allocate the resources for the sidelink communications based on the received first and second parts of the SCI; and performing the sidelink communications to transmit the transmission data to the reception device based on the second resource allocation process.

* * * * *